US006193889B1

(12) United States Patent
Teran et al.

(10) Patent No.: US 6,193,889 B1
(45) Date of Patent: *Feb. 27, 2001

(54) APPARATUS AND METHOD FOR PURIFICATION OF AGRICULTURAL ANIMAL WASTE

(75) Inventors: Alfredo J. Teran, Cape Canaveral; John R. Derrick, Jr., Rockledge; Nidal A. Samad, Merritt Island; W. Todd Willoughby, Cape Canaveral; Richard G. Wood, Merritt Island, all of FL (US)

(73) Assignee: Agrimond, L.L.C., Cape Canaveral, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/250,828

(22) Filed: Feb. 17, 1999

Related U.S. Application Data

(63) Continuation of application No. 09/167,275, filed on Oct. 6, 1998, now Pat. No. 6,039,874.
(60) Provisional application No. 60/061,275, filed on Oct. 7, 1997, provisional application No. 60/070,410, filed on Jan. 5, 1998, provisional application No. 60/070,709, filed on Jan. 7, 1998, and provisional application No. 60/079,360, filed on Mar. 25, 1998.

(51) Int. Cl.[7] ....................................................... C02F 3/00
(52) U.S. Cl. ........................ 210/609; 210/620; 210/622; 210/125.1; 210/196; 210/202
(58) Field of Search .................................. 210/605, 609, 210/620, 621, 622, 195.1, 196, 202

(56) References Cited

U.S. PATENT DOCUMENTS 3,429,806 * 2/1969 Carter et al. ......................... 210/621
3,701,727 * 10/1972 Kormanik ............................ 210/605
3,966,450 6/1976 O'Neill et al. .......................... 71/15

(List continued on next page.)

OTHER PUBLICATIONS

Stith, Pat and Warrick, Joby, "Boss Hog: North Carolina's pork revolution", The News & Observer, Feb. 19–26, 1995, p. 1–3.
Stith, Pat and Warrick, Joby, "New studies show that lagoons are leaking", The News & Observer, Feb. 19, 1995, p. 1–8.
Stith, Pat and Warrick, Joby, "Lacking staff, DEM finds it hard to challenge status quo", The News & Observer, Feb. 19, 1995, p. 1–3.

(List continued on next page.)

Primary Examiner—Christopher Upton
(74) Attorney, Agent, or Firm—Holland & Knight LLP

(57) ABSTRACT

The present invention is drawn to a unique apparatus and method for treating and reusing the wastewater discharged from agricultural animal farms. The apparatus and method of the present invention may be readily sized and configured depending upon the amount and constituent(s) of the wastewater to be treated. In a first embodiment, the apparatus and method of the present invention is designed to be a zero discharge system in which no wastewater will be discharged or spray irrigated. In use, the apparatus and method of the first embodiment may actually require addition of make-up water during periods of low rainfall to make-up water losses due to evaporation and drift. It is contemplated that the only byproduct of the apparatus and method of the first embodiment may be a beneficial sludge if a sufficient number of installations are operated. In a second embodiment, the apparatus and method of the present invention provides a treatment system capable of reducing the nutrient loading in a step-wise fashion so that the wastewater can be used from different steps of treatment in order to apply the varying nutrient loads required by crops on a seasonal basis.

10 Claims, 18 Drawing Sheets

U.S. PATENT DOCUMENTS

| | | | |
|---|---|---|---|
| 4,029,575 | * 6/1977 | Bykowski et al. | 210/605 |
| 4,045,522 | 8/1977 | Nafziger | 261/93 |
| 4,137,158 | 1/1979 | Ishida et al. | 210/16 |
| 4,177,575 | 12/1979 | Brooks | 34/13 |
| 4,183,807 | 1/1980 | Yoshizawa et al. | 210/2 |
| 4,220,723 | 9/1980 | Eckmayer et al. | 435/265 |
| 4,338,337 | * 7/1982 | Frankel | 210/622 |
| 4,348,285 | 9/1982 | Groeneweg et al. | 210/602 |
| 4,432,869 | 2/1984 | Groeneweg et al. | 210/602 |
| 4,592,275 | 6/1986 | Frankl | 99/495 |
| 4,721,569 | 1/1988 | Northrop | 210/607 |
| 4,772,307 | 9/1988 | Kiss et al. | 71/13 |
| 4,824,563 | * 4/1989 | Iwahori et al. | 210/605 |
| 5,062,387 | 11/1991 | Anderson | 119/28 |
| 5,078,882 | 1/1992 | Northrop | 210/602 |
| 5,135,659 | 8/1992 | Wartanessian | 210/666 |
| 5,200,082 | 4/1993 | Olsen et al. | 210/667 |
| 5,282,879 | 2/1994 | Baccarani | 71/10 |
| 5,470,476 | 11/1995 | Taboga | 210/615 |
| 5,472,472 | 12/1995 | Northrop | 71/9 |
| 5,525,239 | 6/1996 | Duske | 210/739 |
| 5,538,529 | 7/1996 | Northrop | 71/9 |
| 5,545,325 | * 8/1996 | Hsu et al. | 210/605 |
| 5,545,560 | 8/1996 | Chang | 435/290 |
| 5,622,630 | 4/1997 | Romano | 210/683 |
| 5,626,644 | 5/1997 | Northrop | 71/9 |
| 5,627,069 | 5/1997 | Powlen | 435/267 |

OTHER PUBLICATIONS

Stith, Pat and Warrick, Joby, "Law restricts hog information, even from N.C. officials", The News & Observer, Feb. 19, 1995, p. 1–3.

Stith, Pat and Warrick, Joby, "Corporate takeovers", The News & Observer, Feb. 21, 1995, p. 1–6.

Stith, Pat and Warrick, Joby, "For Murphy, good government means good business", The News & Observer, Feb. 22, 1995, p. 1–6.

Stith, Pat and Warrick, Joby, "The smell of money", The News & Observer, Feb. 25, 1995, p. 1–5.

Stith, Pat and Warrick, Joby, "Who's in charge?", The News & Observer, Feb. 26, 1995, p. 1–6.

Stith, Pat and Warrick, Joby, "Boss Hog: Information Sources", The News & Observer, p. 1–6.

"Policy Recommendations for Management of Agricultural Animal Waste in North Carolina", Report of the Agricultural Animal Waste Task Force, Nicholas School of the Environment, Apr. 1996, p. 1–2.

"Pork Powerhouses 1996", Successful Farming, SF Pork Powerhouses Oct. 1996, p. 1–5.

Seth Effron, Editor, "You Don't Say", The Insider, Jun. 3, 1996, vol. 4, No. 108, (5 pages).

Knight, Bill, "Megafarms", Apr. 17, 1997, p. 1–2.

Stith, Pat and Warrick, Joby, "Midwest farmers fear N.C.–style expansion", The News & Observer, Feb. 21, 1995, p. 1–6.

Associated Press "Siegrist expects special session", The Iowa Legislative Report, Apr. 19, 1997, p. 1–2.

Sullivan, Ken, "Debate over hog farm issues", The Iowa Legislative Report, Apr. 24, 1997, p. 1.

Boshart, Rod, "2 ag issues left hanging", The Iowa Legislative Report, Apr. 30, 1997, p. 1–2.

Boshart, Rod, "Hot lot issues linger", The Iowa Legislative Report, May 1, 1997, p. 1–2.

"Agriculture: Successful Farming", Pork Powerhouses, p. 1.

Levine, Adam, "Overwhelming Majority Passes Hog Farm Bill", Missouri Digital News, May 16, 1996, p. 1.

"Welcome to Circle Four Farms", Circle 4 Farms (5 pages).

"C.O.W. spells success for Murphy Family Farms", Jan. 18, 1997, p. 1.

Wagner, John, "Hayes issues aggressive plan for addressing hog–farm problems", The News & Observer, Feb. 16, 1995, p. 1–2.

General Assembly of North Carolina, Session 1997, House Bill 85, "Environmentally Sound Policy Act", Feb. 10, 1997, p. 1–7.

General Assembly of North Carolina, Session 1997, House Bill 307, "Environmentally Sound Policy Act", Feb. 24, 1997, p. 1–7.

General Assembly of North Carolina, Session 1997, House Bill 515, "Environmentally Sound Policy Act", Mar. 13, 1997, p. 1–8.

General Assembly of North Carolina, Session 1997, House Bill 238, "Facilitate Animal Waste Mgt. Research", Feb. 17, 1997, p. 1–2.

General Assembly of North Carolina, Session 1997, House Bill 357, "General Animal Waste Permits", Feb. 27, 1997, p. 1–2.

General Assembly of North Carolina, Session 1997, Senate Bill 478, "Amend Swine Farm Laws", Mar. 25, 1997, p. 1–6.

General Assembly of North Carolina, Session 1997, House Bill 944, "Zoning/Siting Swine Farms", Apr. 15, 1997, p. 1–4.

General Assembly of North Carolina, Session 1997, House Bill 974, "Improve Animal Waste Management", Apr. 16, 1997, p. 1–4.

General Assembly of North Carolina, Session 1997, Senate Bill 1043, "Comprehensive Water Quality Management", Apr. 21, 1997, p. 1–5.

Neff, Joseph and Leavenworth, Stuart, "Builders big losers in moratorium", The News & Observer, Apr. 9, 1997, p. 1–3.

Editorial: The best hog plan, The News & Observer, Apr. 9, 1997, p. 1–2.

Wagner, John, "Hunt to back hog ban", The News & Observer, Apr. 8, 1997, p. 1–3.

Patterson, Dennis, "Farmers gather at legislature to protest new hog regulations", The News & Observer, Mar. 27, 1997, p. 1–2.

Rawlins, Wade, "Tension growing over hog rules", The News & Observer, Apr. 3, 1997, p. 1–3.

Editorial: Eye on the hog plan, The News & Observer, Apr. 16, 1997, p. 1–2.

Neff, Joseph, "Effort to curb hogs stays alive in House committee", The News & Observer, Mar. 20, 1997, p. 1–3.

Neff, Joseph, "House leaders seek new hog–farm curbs", The News & Observer, Mar. 13, 1997, p. 1–2.

Leavenworth, Stuart, "Hog farm debate draws crowd to legislature", The News & Observer, Mar. 6, 1997, p. 1–3.

Allegood, Jerry, "Craven halts hog farm permits for year", The News & Observer, Feb. 26, 1997, p. 1–2.

Neff, Joseph, "Hog debate focuses on zoning", The News & Observer, Apr. 15, 1997, p. 1–3.

Neff, Joseph, "House passes curbs on hog farms", The News & Observer, Apr. 30, 1997, p. 1–3.

Heath, Jena, "Copies of report on suggested hog–farm laws are getting scarce", The News & Observer, May 27, 1997, p. 1.

"Dome: governor waffles on hog curbs", The News & Observer, Apr. 2, 1997, p. 1–2.

Associated Press, "Activists push for strict rules on livestock farms", The News & Observer, May 17, 1996, p. 1–2.

Editorial: Senate menu: pork, The News & Observer, May 2, 1997, p. 1–2.

Letter: Rogers' quaint delusions about N.C. farming, The News & Observer, Apr. 26, 1997, p. 1–2.

Neff, Joseph, "Once mired in committee, a hog bill takes wings", The News & Observer, Mar. 21, 1997, p. 1–3.

General Assembly of North Carolina, Session 1995, Senate Bill 695, "Agriculture Waste Commission", Apr. 13, 1995, p. 1–3.

General Assembly of North Carolina, Session 1995, Senate Bill 1345, "Animal Waste Permits/Inspections", May 27, 1996, p. 1–5.

General Assembly of North Carolina, Session 1995, House Bill 524, "Agriculture Waste Commission", Mar. 22, 1995, p. 1–3.

General Assembly of North Carolina, Session 1995, House Bill 1293, "Bladen CC Swine Funds", May 22, 1996, p. 1.

"A short history of hogs in North Carolina", The News & Observer, Apr. 15, 1997, p. 1.

Seth Effron, Editor, "You Don't Say", The Insider, May 27, 1996, vol. 4, No. 103, (5 pages).

Rose, James, "Irked Valentine wants hog panel to get to work", The News & Observer, Jan. 19, 1996, p. 1–3.

Eckenfelder J.. "Principles of Water Quality Management" pp. 135, 355, 545–546, 591, 639, 1980.*

Steel & McGhee "Water Supply and Sewage" pp. 282–283, 438–460, 518–520, 535–536, 1979.*

* cited by examiner

FIG. 16

| PARAMETER | SCREENED SOLIDS/COMPOSTED MATERIAL | DRIED PRECIPITATED SOLIDS |
|---|---|---|
| TOTAL NITROGEN, ppm | 169,395 | 11,302 |
| AMMONIA-NITROGEN, ppm | 1,246 | 796 |
| NITRATE-NITROGEN, ppm | 12.4 | 17.0 |
| TOTAL PHOSPHORUS, ppm | 5,655 | 5,430 |
| POTASSIUM, ppm | 3,061 | 958 |
| CALCIUM, ppm | 9,022 | 6,716 |
| MAGNESIUM, ppm | 3,118 | 2,383 |
| SULFUR, ppm | 1,607 | 1,256 |
| IRON, ppm | 689 | 652 |
| MANGANESE, ppm | 71.2 | 78.2 |
| ZINC, ppm | 195 | 233 |
| COPPER, ppm | 37.5 | 38.1 |
| BORON, ppm | 12.0 | 2.4 |
| CHLORIDE, ppm | 639 | 337 |
| CARBON, ppm | 417,343 | |
| SODIUM, ppm | 807 | 374 |
| pH, S.U. | 6.71 | 6.53 |
| C:N RATIO | 25.46 | |
| DRY MATTER, % | 24.42 | 92.21 |

APPARATUS AND METHOD FOR PURIFICATION OF AGRICULTURAL ANIMAL WASTE

CROSS-REFERENCE TO RELATED APPLICATIONS

This application is a continuation of U.S. application Ser. No. 09/167,275 filed Oct. 6, 1998, now U.S. Pat. No. 6,039,874. U.S. application Ser. No. 09/167,275 claims the benefit of U.S. Provisional Application Ser. No. 60/061,397, filed on Oct. 7, 1997; U.S. Provisional Application Ser. No. 60/070,410 filed on Jan. 5, 1998; U.S. Provisional Application Ser. No. 60/070,709 filed on Jan. 7, 1998; and U.S. Provisional Application Ser. No. 60/079,360 filed Mar. 25, 1998. The disclosure of U.S. application Ser. No. 09/167,275 and of the provisional applications are incorporated herein by reference.

BACKGROUND OF THE INVENTION

1. Field of the Invention

The present invention relates to an apparatus and method for the purification of agricultural animal waste and, more particularly, to a system for treatment of manure and wastewater and the reuse of wastewater produced and as a byproduct of agricultural facilities.

2. Description of the Background Art

Over the past decades there has been a shift from smaller localized family farms toward larger integrated confinement agricultural operations. Specifically, large agricultural operations may utilize confinement barns to house a large number of livestock such as swine, poultry or dairy cows. Using the swine industry as an example, often numerous hog-confinement operations are grouped in close proximity forming "mega-farms" which may house tens of thousands of hogs. Similarly, the dairy industry operates using large factory farms that house thousands of animals in a relatively small land area. While these larger agricultural operations have numerous advantages, attendant with these larger facilities are pollution problems relating to the handling and treatment of manure and wastewater (hereinafter collectively "wastewater"). By way of example, pollution problems associated with liquid animal waste, such as produced by the swine industry, include nitrogen, phosphorus, solids, bacteria and foul odors that result from anaerobic digestion. Environmental concerns more specifically center on odor and water quality issues.

Currently, most agricultural facilities use anaerobic digestion for treatment of animal wastes and wastewater. The primary reasons for using anaerobic digestion is simplicity and cost. Wastewater is simply discharged from the animal storage facility into an open lagoon or plurality of lagoons (ponds used to store and treat thousands to millions of gallons of animal waste) where the waste undergoes natural anaerobic digestion. After retention in the lagoon system, wastewater is usually land applied via spray irrigation. However, over forty (40) noxious gases may be emitted from anaerobic lagoons at hog and/or dairy farms including ammonia, methane and hydrogen sulfide. Additionally, the time required for digestion of the organic wastes is relatively long, from weeks to months. Some current regulations require a residence time of 180 days for animal waste facilities using anaerobic lagoons for digestion. Neighbors find odors emanating from lagoons, confinement houses, and fields onto which wastes are sprayed to be a nuisance. In fact, as a result of odor problems associated with anaerobic lagoons, certain states have legally mandated buffer zones or designated land areas between lagoon sites and populated areas.

Oftentimes, the reduction of organics and nutrients within an anaerobic lagoon is minimal and therefore high quantities of nitrogen, phosphorus, etc. are applied to the land during spray irrigation. These nutrients readily build up high residual concentrations in the soil, leach directly into the groundwater or run-off into surface waters causing algal blooms, oxygen deficiencies and fish kills.

New studies have also shown that lagoons are leaking and there have been pollution problems with the groundwater, rivers, lakes and coastal waters primarily in states where the high concentrations of hog or other farms are located. Another problem attendant with traditional anaerobic settling lagoons is that occasionally the water overflows the lagoons or the earthen containment berms collapse, primarily during periods of heavy rainfall, and the wastewater runs-off into streams, rivers and lakes, causing severe pollution problems. When wastewater escapes from these lagoons, either resulting from overflows or other failures, the high concentration of pollutants has adverse effects on the receiving waters and commonly results in groundwater contamination and massive fish and other aquatic life kills.

The most critical problem in the recent past has been with the microorganism *Pfiesteria piscicida*. *Pfiesteria piscicida* is a dinoflagellate related to the species of dinoflagellates that cause "red tides". This bacterium has the ability to take on up to twenty four (24) different forms during its life cycle and can attack and kill fish within hours. Recent outbreaks of *Pfiesteria piscicida* could be attributed to the increase in nutrients in the water or to the weakening of the fish due to stress caused by lack of oxygen and/or elevated ammonium levels, among other factors.

By way of example, hog anaerobic lagoon liquid effluent has nutrient characteristics including high levels of biochemical oxygen demand ($BOD_5$), Total Nitrogen (TN) and Phosphorus that cannot be decreased to acceptable levels by anaerobic treatment alone.

Even with bacterial digestion within an anaerobic lagoon, significant amounts of sludge accumulate in an anaerobic lagoon. Anaerobic lagoons may fill to capacity fairly quickly which displaces the designed retention capacity of the lagoon fairly quickly and often serve to provide only partial pretreatment. Hogs produce two to four times as much waste, per hog, as the average human and, in North Carolina alone, hogs produce about 9.5 million tons of manure a year. Therefore, a great deal of land is required for spreading the highly concentrated waste since often no discharge is permitted from animal waste facilities. Farmers who specialize in raising large quantities of animals are forced by regulations to use larger and larger areas of land in which to spread the large quantities of wastes generated from higher numbers of animals. This has, and will continue, a trend toward having to sacrifice more land to simply dispose of the waste. The land utilized for land spreading of waste cannot be just any land and must be carefully selected or altered so as to prevent any rainfall runoff discharging into any surface waters. The land must be planted with species capable of tolerating high nitrogen and high phosphorus containing wastes. The farming industry is running out of places to spread or spray the waste from lagoons.

At least one state has contemplated a moratorium on new hog farm facility construction until such time as a solution can be devised to resolve agricultural wastewater treatment issues. Additionally, in North Carolina, owners of existing agricultural waste management systems which were constructed prior to Dec. 31, 1993, must register with the state and have their animal waste management plan certified by a technical specialist.

Continuing efforts are being made to improve agricultural and animal waste treatment methods and apparatus. By way of example, note U.S. Pat. No. 5,472,472 to Northrop and U.S. Pat. No. 5,078,882 to Northrop. U.S. Pat. No. 5,472,472, discloses a process for the transformation of animal waste wherein solids are precipitated in a solids reactor, the treated slurry is passed to a bioreactor zone where soluble phosphorus is precipitated with metallic salts, the slurry is aerobically and anaerobically treated to form an active biomass. The aqueous slurry containing bioconverted phosphorus is passed into a polishing ecoreactor zone wherein at least a portion of the slurry is converted to a beneficial humus material. In operation, the system requires numerous chemical feeds and a series of wetland cells comprising microorganisms, animals and plants. See also U.S. Pat. Nos. 4,348,285 and 4,432,869 to Groeneweg et al.; U.S. Pat. No. 5,627,069 to Powlen; U.S. Pat. No. 5,135,659 to Wartanessian and U.S. Pat. No. 5,200,082 to Olsen et al. (relating to pesticide residues); U.S. Pat. No. 5,470,476 to Taboga and U.S. Pat. No. 5,545,560 to Chang.

Another grouping of background patents are those which disclose methods of treating wastewater rich in nutrients. Note U.S. Pat. No. 5,626,644 to Northrop; U.S. Pat. No. 4,721,569 to Northrop; U.S. Pat. No. 4,183,807 to Yoshizawa et al.

Another grouping of background patents are those which disclose methods of producing humus material or spreadable fertilizer from animal waste. By way of example see U.S. Pat. No. 5,538,529 to Northrop; U.S. Pat. No. 5,525,239 to Duske and U.S. Pat. No. 5,282,879 to Baccarani.

The disclosures of the documents submitted as part of the Information Disclosure Statement previously filed concurrently with U.S. application Ser. No. 09/167,275 are incorporated by reference in their entirety. Additionally, the full text and disclosures of Appendix A entitle "Dairy Recovery & Reuse Project" and Appendix B entitled "Hog Farm Wastewater Treatment and Reuse System" filed concurrently herewith are incorporate by reference in their entirety.

Not withstanding the existence of such prior art treatment systems, it remains clear there is a need for a wastewater treatment system that reduces the retention time of waste in an open lagoon, may operate as a "closed-loop" system with no land spreading of waste or, during treatment, significantly reduces the amount of nutrient load in the treated wastewater such that less land is required for land spreading and recycles and reuses water for use by agricultural animals.

Efforts to improve the methods and apparatus to reduce the deleterious effects of wastewater byproducts from agriculture continue. Accordingly, it is an object of the invention to provide an improvement that overcomes inadequacies of the prior art method and apparatus and provides an improvement, which is a significant contribution to the advancement of the art.

Another object of this invention is to provide a new and improved system for purification of agricultural animal waste that has all the advantages and none of the disadvantages of the prior art.

A further object of the present invention is to provide a system to treat manure and wastewater having a minimal impact on the environment.

Another object of the invention is to provide an approved treatment apparatus and method that significantly reduces the amount of nutrient loading in the treated wastewater such that less land is required for spray irrigation or land spreading.

Another object of the invention is to provide an apparatus and method of treating agricultural wastewater whereby minimal or no land spread irrigation is required.

Another object of the invention is to provide an effective treatment of the wastewater using methods that will greatly reduce, if not eliminate, the foul odors associated with anaerobic lagoons and providing a closed loop treatment process.

Another object of the invention is to treat wastewater without greatly reducing the nutrients present in any recovered sludge.

Another object of the invention is the creation of an efficient, impervious aerobic lagoon that does not consume a large surface area and that does not pose an impact to groundwater.

Another object of the invention is to provide drinking water suitable for agricultural livestock through use of ozone purification of treated wastewater.

Another object of the invention is to provide a system for the purification of agricultural wastewater that is economically feasible.

Another object of the invention is to provide an apparatus and method more energy efficient than currently available treatment systems.

Another object of the invention is to provide an apparatus and method for treatment of agricultural waste, which meets regulatory compliance.

The foregoing has outlined some of the pertinent objects of the invention. These objects should be construed to merely be illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purposes of summarizing the invention, the present invention is drawn to a unique apparatus and method for treating and reusing the wastewater discharged from agricultural animal farms. The apparatus and method of the present invention may be readily sized and configured depending upon the amount and constituent(s) of the wastewater to be treated. In a first embodiment, the apparatus and method of the present invention is designed to be a zero discharge system in which no wastewater will be discharged or spray irrigated. In use, the apparatus and method of the first embodiment may actually require addition of make-up water during periods of low rainfall to make-up water losses due to evaporation and drift. It is contemplated that the only byproduct of the apparatus and method of the first embodiment may be a beneficial sludge if a sufficient number of installations are operated.

In a first embodiment, typical of that which may occur at a hog farm installation, the apparatus and treatment method of the present invention will consist of several phases following delivery of the wastewater effluent from the agricultural sites. The wastewater influent is first passed through a mechanical screen where bulk solids (in the case of hog farm wastewater this will consist primarily of corn) are separated and partially de-watered. The screened influent is then directed to a primary plastic-lined earthen lagoon where it undergoes aerobic digestion utilizing specially selected bacteria. Treatment in the lagoon serves to break down organics and oxidize both macro- and micro-nutrients resulting in the reduction of $BOD_5$, COD, TKN, and ammonium-nitrogen. After treatment in the primary lagoon, the wastewater may be used to wash the floors of the hog houses or undergoes a purification phase including solids separation, nitrification/denitrification, filtration and sterilization.

Periodic flushing of the sub-floor space beneath the hog pens in the animal houses serves to carry fresh waste to the treatment system. By using aerobically treated wastewater from the aerobic treatment lagoon, the sub-floor space is thereby incorporated into the treatment system. Aerobically treated wastewater carries with it the beneficial bacteria to begin the digestion of organics beneath the floor of the animal houses without the presence or generation of noxious gases, which is a problem associated with flushing with anaerobic lagoon water. This will help to reduce health risks not only with the noxious gases but also with pathogenic bacteria associated with the anaerobic waste.

The solids separation phase (clarification process) and nitrification/denitrification phases preferably take place in above-ground tanks where suspended solids removal will occur as well as nitrification followed by subsequent denitrification for nitrate reduction. The clarification process may be facilitated through use of polymer addition. The precipitated solids following polymer addition will be sent first to a decanting tank for sludge thickening and then to a plurality of drying beds for de-watering and subsequent removal. The aerobically digested sludge will remain on the plurality of drying beds for a short period of time, to reduce water content, and since it is an aerobic not anaerobic sludge, odor should be greatly reduced or eliminated.

Clarified wastewater having gone through the solids separation phase then undergoes vigorous aeration to further oxidize organics promoting complete nitrification. This step is followed by a denitrification phase whereby the wastewater enters an anoxic environment for removal of nitrates prior to final treatment.

The final phase of treatment consists of reusing the treated wastewater. Effluent from the denitrification phase undergoes filtration and sterilization using ozone to provide drinking and misting water to the animals. Filtration with multiple filter media serves to remove turbidity, suspended solids, taste, odor and residual organics from the water prior to ozonation. Ozone will provide further oxidation of organics and disinfection of the wastewater resulting in drinking water suitable for animal consumption and/or misting water to cool the animals during warm temperatures. The first embodiment of the present invention requires no land spreading of agricultural animal waste and drastically improves the quality of recycled water.

In a second embodiment, typical of that which may occur at a dairy farm installation, the apparatus and treatment method of the present invention will consist of several phases following delivery of the wastewater effluent from the agricultural sites.

The first phase of treatment will include an aerobic lagoon custom designed to accommodate the size of the agricultural facility and which will accommodate an increase in population for future growth. Treatment in the aerobic lagoon with bacteria will greatly reduce organics and odor and promote nitrification of the nitrogenous waste (converting ammonia to nitrates). Preferably, the aerobic lagoon incorporates an energy efficient aeration/circulation system to promote mixing and oxygenation. In the aerobic phase of treatment, odor elimination will occur within hours of system start-up and significant organics reduction as well as nitrification will occur on a daily basis. Specialized bacteria will be isolated and propagated specific for the dairy waste which will create a selective dominance within the lagoon and enhance the digestion of the wastes.

The second phase of treatment will include an anoxic lagoon that is sized to handle up to several days retention for anoxic processes including denitrification, converting nitrates to nitrogen gas. This phase will be variable depending on the seasonal nutrient demands imposed by the crops. It can be omitted if high quantities of nutrients including nitrate-nitrogen and phosphate are required by the crops or maximized if little quantities of these nutrients are required. The apparatus and method of the second embodiment will have means for controlling the nutrient levels that are applied to the crop land via spray irrigating from the various stages of treatment.

The third phase of the process is a solids precipitation step which is primarily for phosphorus removal (clarification means). It is anticipated that the clarified water will be virtually phosphorus free. The nutrient rich accumulated sludge is dried on-site in drying beds followed by deactivation for use as solid fertilizer.

The optional final phase of treatment consists of reusing the treated wastewater for livestock bathing and cooling. Effluent from the denitrification phase undergoes filtration and sterilization using ozone to bathing and cooling water to the animals.

Treated wastewater according to the present invention may be either reused for animal drinking and bathing or land applied (with a significant reduced nutrient content).

The foregoing has outlined rather broadly the more pertinent and important features of the present invention. The detailed description of the invention that follows is offered so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent construction does not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 16 is a table illustrating parameter test data obtained from a hog farm agricultural test facility according to the first embodiment of the present invention;

Similar reference characters refer to similar parts throughout the several views of the drawings.

DETAILED DESCRIPTION

Figure 1:
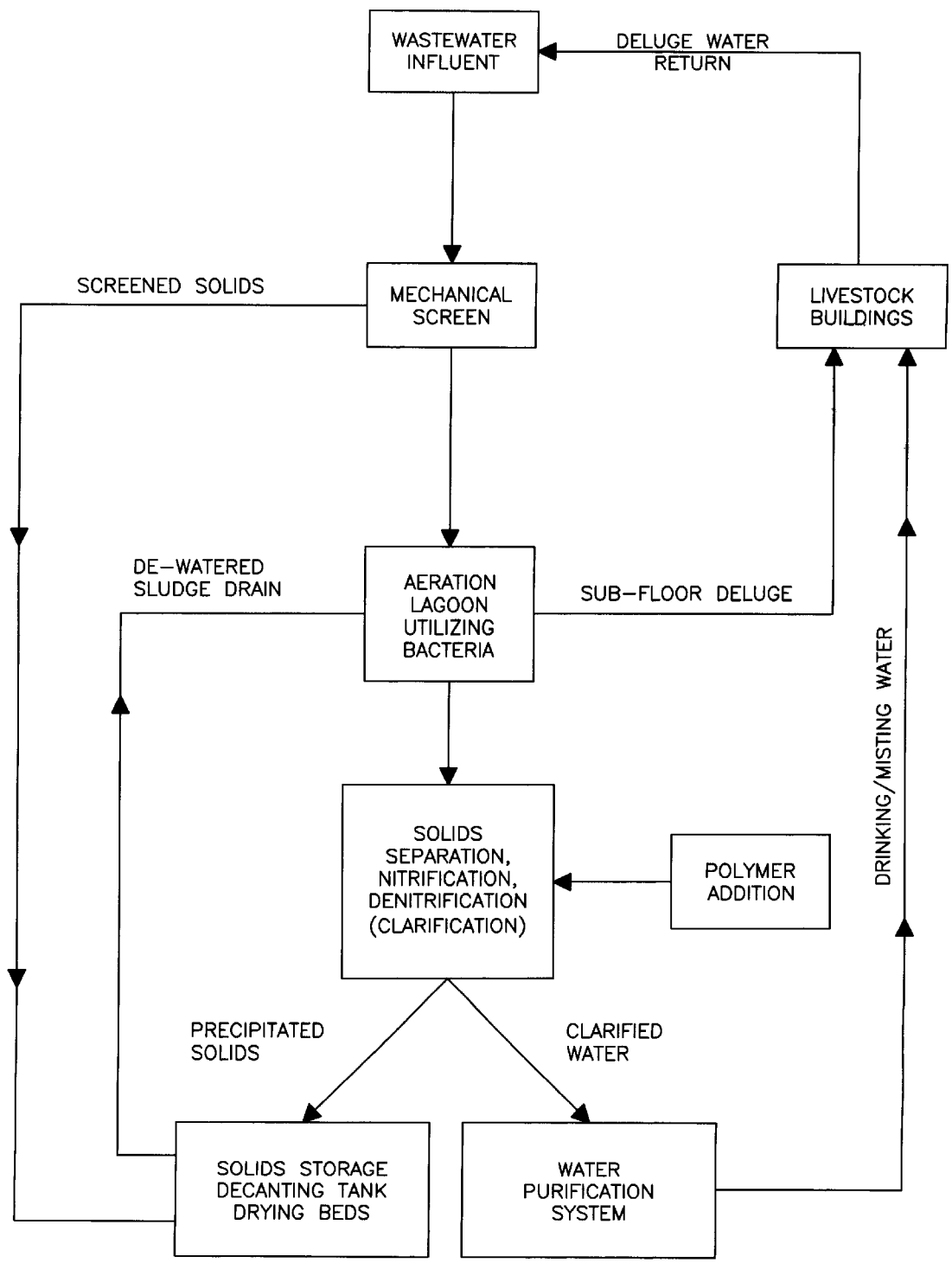
FIG. 1 is a flow diagram illustrating a first embodiment of the present invention.

With reference to the drawings, and in particular FIGS. 1–2 and 17–18 thereof, a new and improved animal waste treatment apparatus and method embodying the principles and concepts of the present invention and generally designated by the reference number 1 will be described.

Each agricultural operation where livestock, such as swine or dairy are produced and housed, will have different wastewater parameters and water requirements. System design and sizing will depend upon the wastewater effluent flow and $BOD_5$ input. These values will be dependent upon the type of farm, hog (sow, nursery or finishing), cattle or chicken and the number of animals per farm. For ease in description, a first embodiment suitable for installation and use on a hog farm will be described in detail first.

Hog Farm Installation

By way of background, a swine operation may have several types of farms including sow, nursery and finishing farms. A sow farm would include breeding animals along with their offspring. Generally, a sow has an average weight of ~430 lbs. and generates roughly ten gallons of wastewater per day per sow for a $BOD_5$ input of 0.42 lbs./sow/day (extrapolated value based upon $BOD_5$ input of 0.27 lbs./day for a 275 pound sow). A nursery farm houses nursery pigs at an average weight of thirty to fifty pounds. Nursery pigs generate roughly two gallons of wastewater per day per hog for a $BOD_5$ input of 0.11 lbs./hog/day. A finishing hog generates approximately four gallons of wastewater per day per hog for a $BOD_5$ input of 0.47 lbs./hog/day. A typical hog diet would consist of corn/soybean feed and necessary mineral supplements.

Agricultural operations where livestock such as swine are produced and housed are water intensive. The apparatus illustrated in FIGS. 2–4 embodying the principles and concepts of the present invention is sized and dimensioned to handle the agricultural waste stream from a finishing farm containing eight (8) hog houses with approximately 1225 hogs per house, for a total of approximately 9800 hogs. Each finishing hog generates an average of ~3.5 gal/day of wastewater with a $BOD_5$ input of 0.47 lbs/day per hog. This translates to a total wastewater generation of ~34,240 gallons per day and a total $BOD_5$ loading of ~4,600 pounds per day. Additionally, each finishing hog requires ~3.5 gallons/day water for drinking and/or misting. Misting requires ≦1.0 gallon/day/hog during daylight hours in warm weather.

Generally, hog houses have under floor flushing from a water source (typically recycled wastewater from a treatment lagoon) for waste removal. Typically, deluge water is stored in 650 to 850 gallon tanks with flushing occurring on a set schedule. Therefore, assuming that flushing for waste removal occurs every sixty-five minutes during daylight hours, the amount of water utilized for daily waste removal flushing is ~66,000 gallons per day. Therefore, total daily wastewater production is ~35,000 gallons waste/day plus ~66,000 gallons flush/day.

The primary pollutant problems associated with hog farms include nitrogen, solids, bacteria and the foul odors produced by anaerobic digestion (ammonia, hydrogen sulfide, methane, etc.). A "typical" hog anaerobic lagoon liquid effluent from this size agricultural operation may have the nutrient characteristics as listed in the following table:

| Parameter | Hog Lagoon Effluent (mg/L) | Raw Municipal Sewage (mg/L) |
| --- | --- | --- |
| $BOD_5$ | 691 | 220 |
| Total Kjeldahl Nitrogen (TKN) | 563 | 30 |
| Phosphorus | 225 | 8 |

The first embodiment of the present invention is based upon a multiphase approach including aerobic treatment in an aerobic lagoon with mechanical aeration, solids separation and nitrification/denitrification in an oxic/anoxic environment and disinfection of water through use of ozone. It is well within the skill of one in the art to vary the size of individual components and retention times based upon the parameters and amount of the agricultural wastewater.

Figure 2:
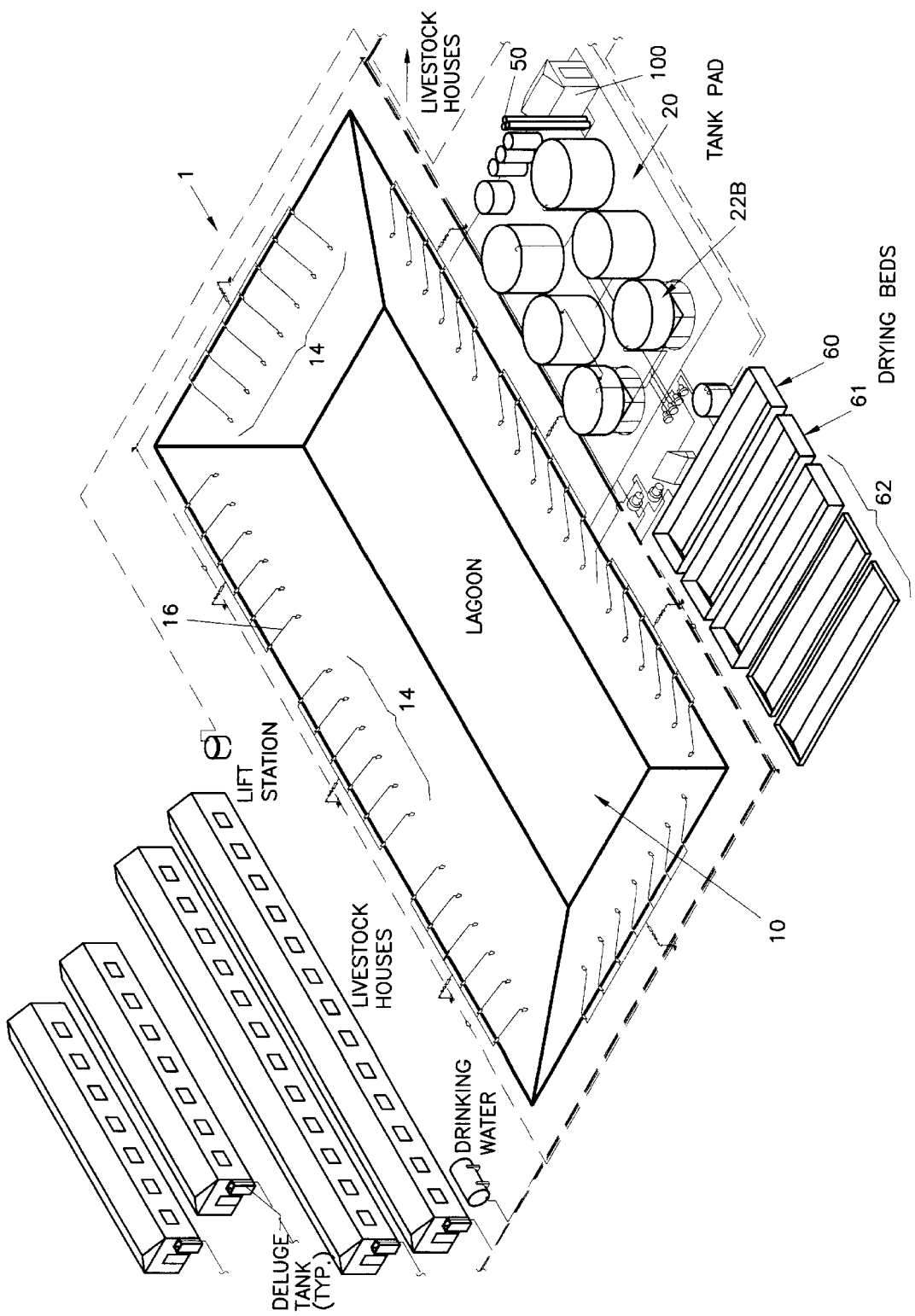
FIG. 2 is a perspective view of a first embodiment of the purification system of the present invention.
Figure 3:
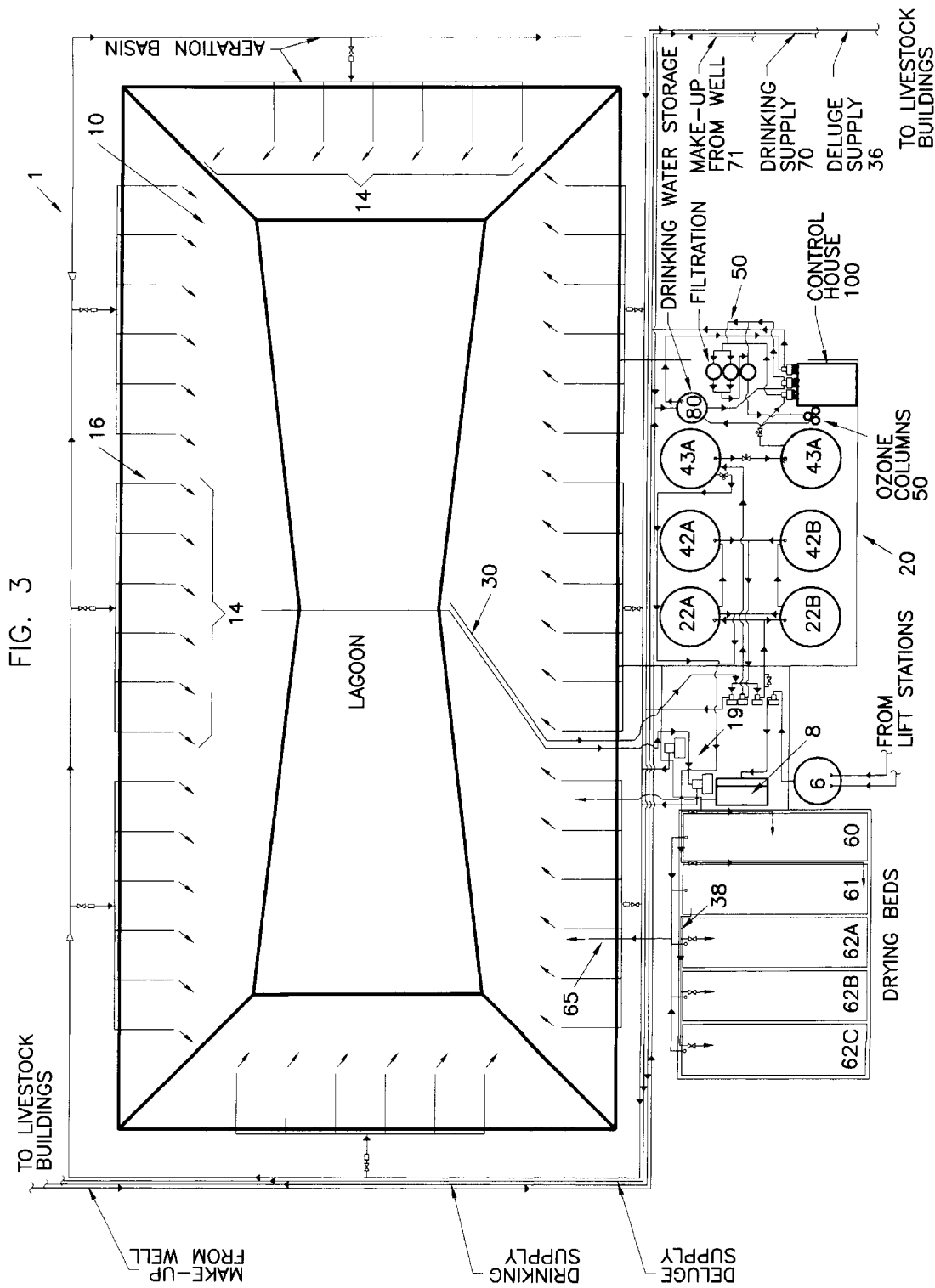
FIG. 3 is a top view and flow diagram of the first embodiment of the present invention.
Figure 4:
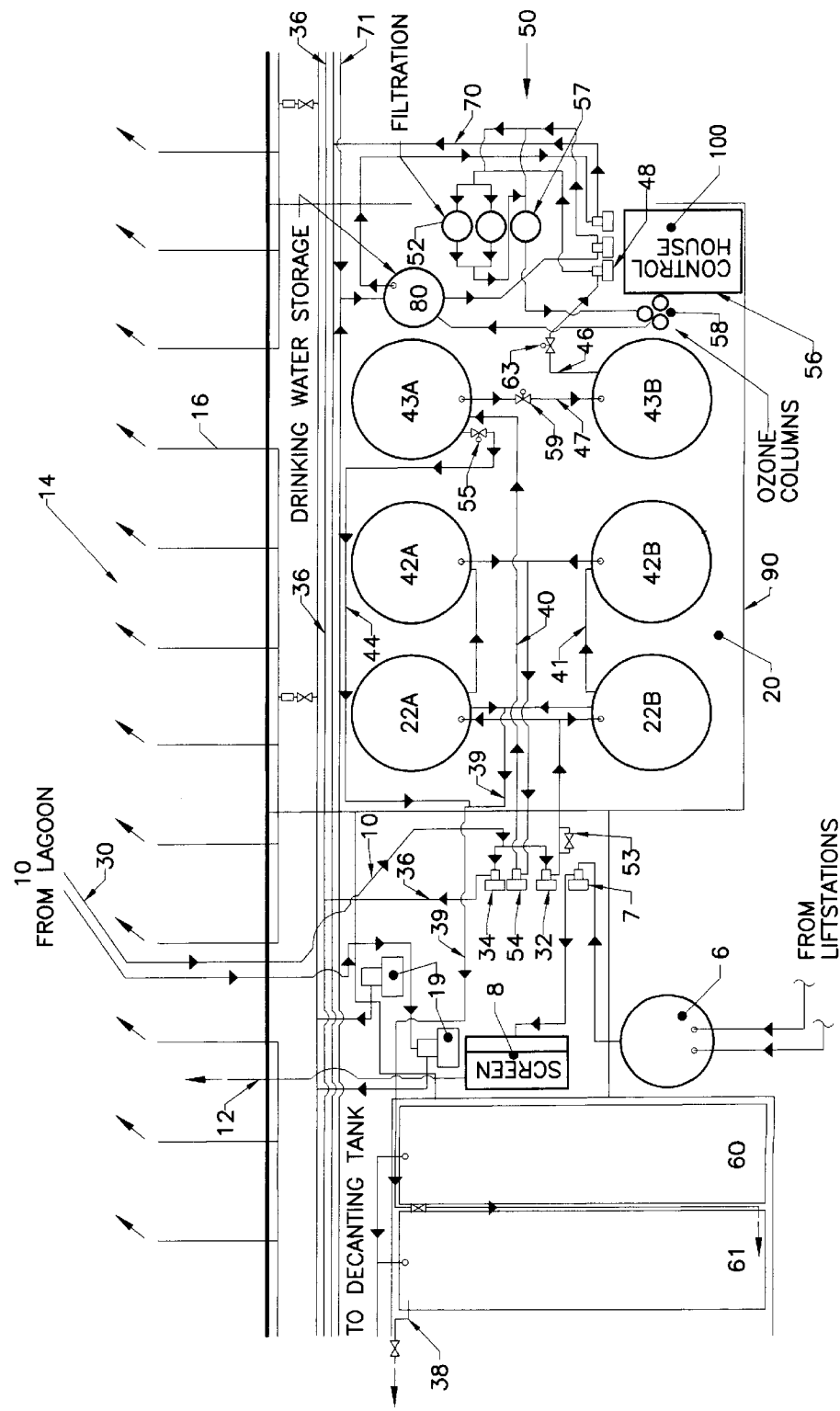
FIG. 4 is a detailed representation of the solids separation, nitrification/denitrification phase and purification system of the first embodiment of the present invention.

FIGS. 2–4 illustrate new installation/constructions in which a custom apparatus and system is designed for a specific agricultural operation. However, based upon the teachings of the present invention, it is within the skill of one in the art to retrofit existing agricultural facilities with equipment for treating the wastes modifying existing piping and lagoons to accomplish the proposed treatment scheme.

The wastewater purification system 1 of the present invention comprises an aerobic lagoon 10 wherein the primary treatment occurs based upon a combined organic oxidation/nitrification process. The main advantage of aerobic treatment is that bacterial digestion tends to be more complete and occurs more rapidly than in an anaerobic treatment.

As illustrated in FIGS. 1 and 3, wastewater influent collected from each animal retention area or penning area will be directed to a mechanically aerated lagoon via gravity or at least one lift station/grit station (not shown). As illustrated in FIG. 4, prior to introduction into the aerobic lagoon 10, a pump 7 draws wastewater from a surge tank 6 where the wastewater is deposited via gravity and/or lift stations through a mechanical screen 8. Any commercially available water pump such as those sold by Jacuzzi® and Myers® may be utilized in the present application. The mechanical screen removes bulk solids (primarily corn). Preferably, removed bulk solids are transferred to a storage area 60 for drying until removal from the site. The storage area is preferably a series of drying beds (60, 62A, 62B and 63C). Once screened, the wet solids then pass through a mechanical roll press (not shown) for significant moisture reduction. The liquid waste simply passes through the mechanical screen and is directed to the aerobic lagoon. The benefit of mechanically screening the wastewater prior to introduction into the aerobic lagoon is that preventing the bulk solids from being introduced into the lagoon significantly reduces oxygen demand on the system.

The screened solids are an excellent compost material resulting from a carbon:nitrogen (C:N) ratio of ~25 and the optimum C:N ratio for compost material is in the range of 20 to 30. The composted end product will be a superior fertilizer and/or soil amendment due to the high nutrient content. See FIG. 16 for relevant analytical data obtained at a hog farm agricultural test facility according to the first embodiment of the present invention.

Figure 6:
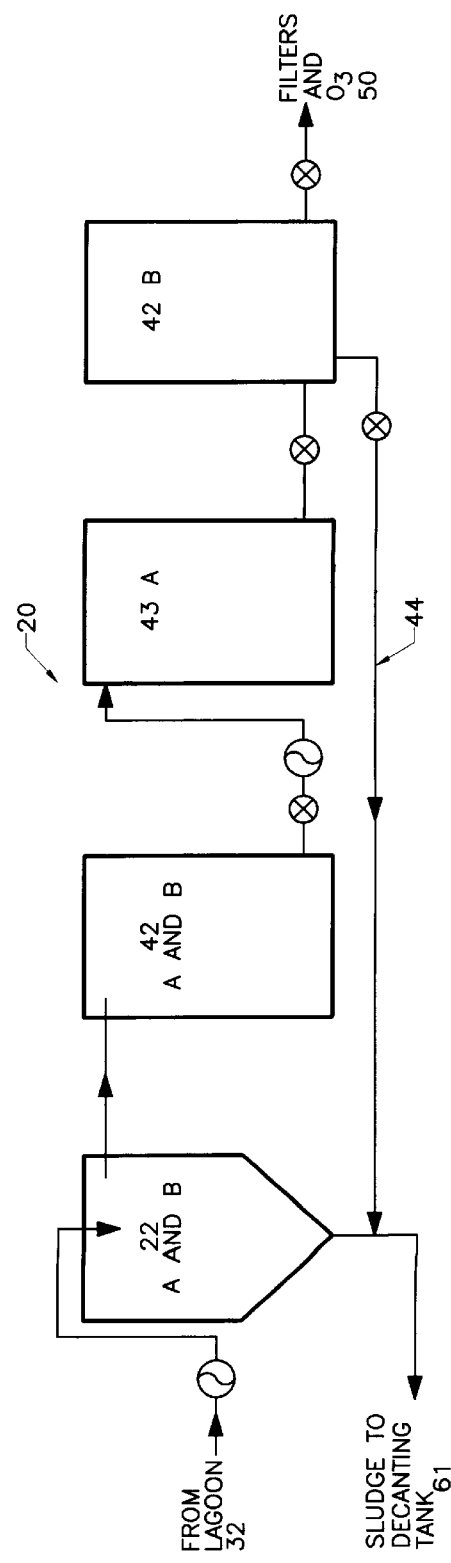
FIG. 6 is a flow diagram of wastewater transfer through the solids separation, nitrification/denitrification phase of the purification system of the first embodiment of the present invention.
Figure 6A:
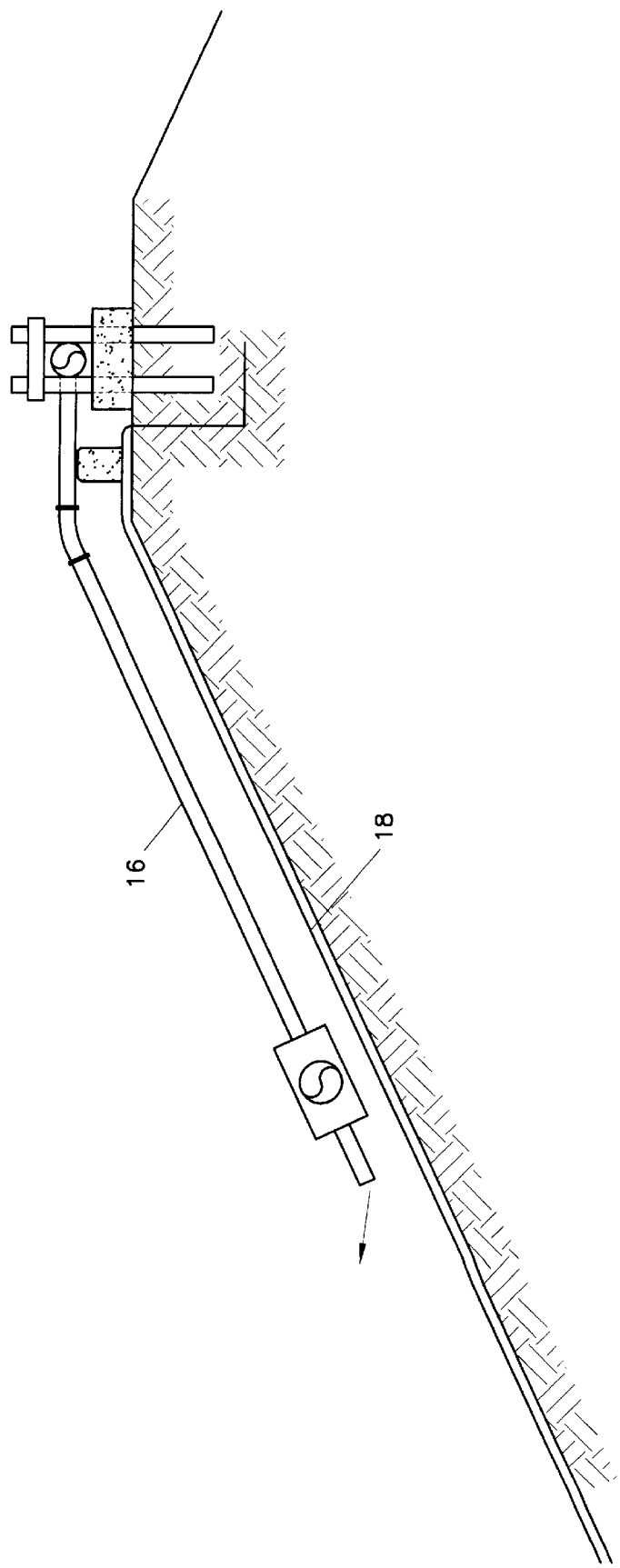
FIG. 6a is a sectional view of an aerator injector.
Figure 7:
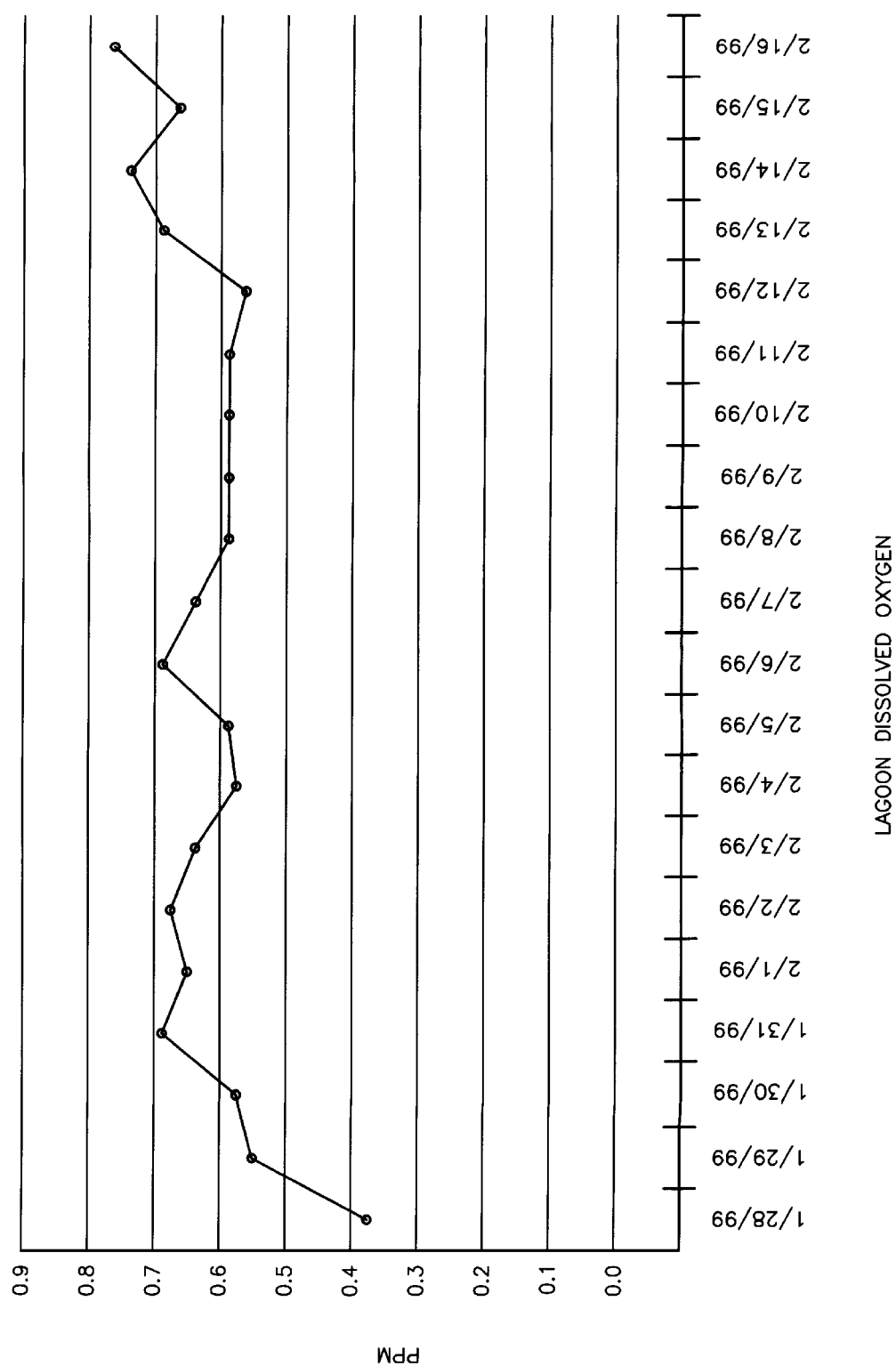
FIG. 7 is a table illustrating Lagoon Dissolved Oxygen Levels test data obtained from a hog farm agricultural test facility according to the first embodiment of the present invention.
Figure 8:
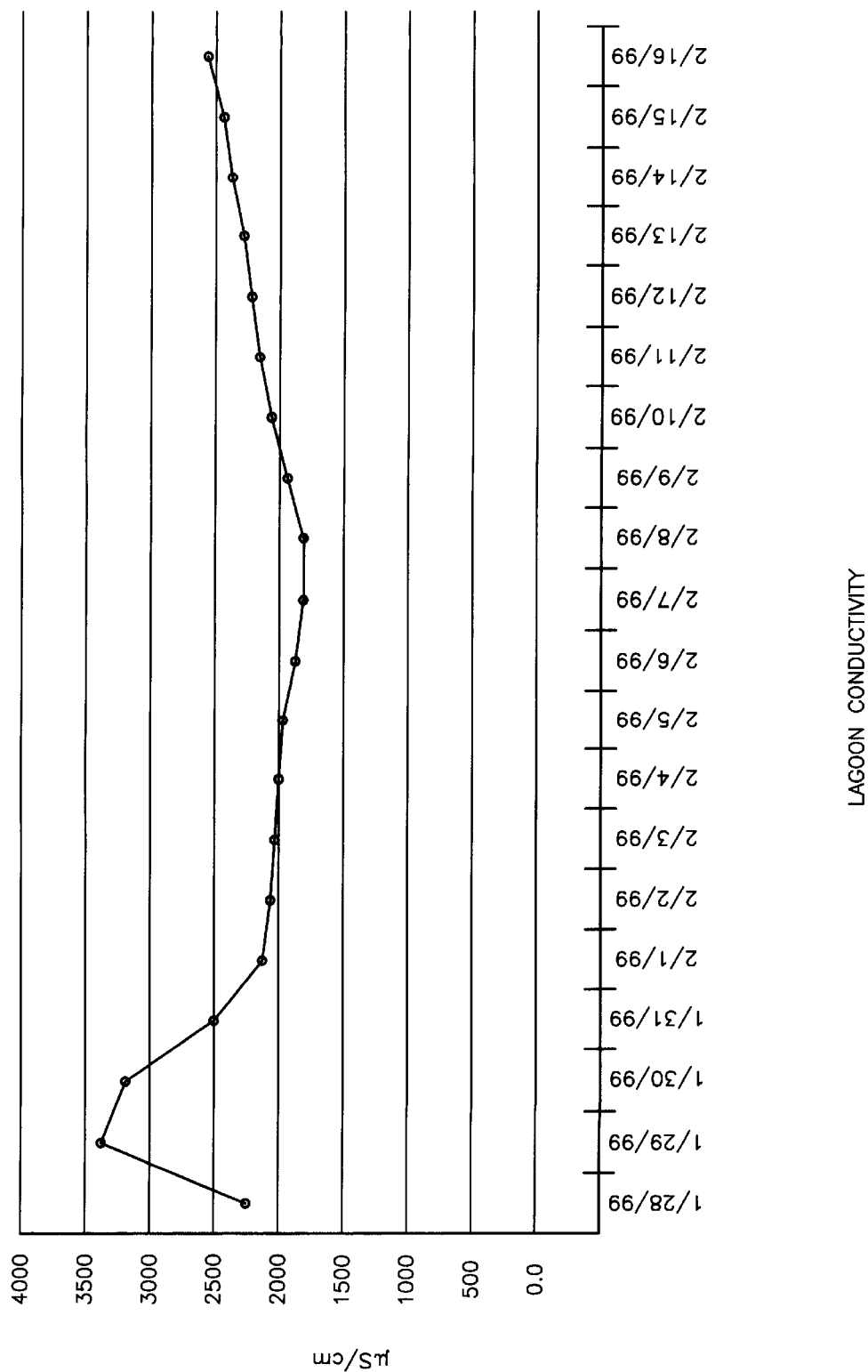
FIG. 8 is a table illustrating Lagoon Conductivity test data obtained from a hog farm agricultural test facility according to the first embodiment of the present invention.
Figure 9:
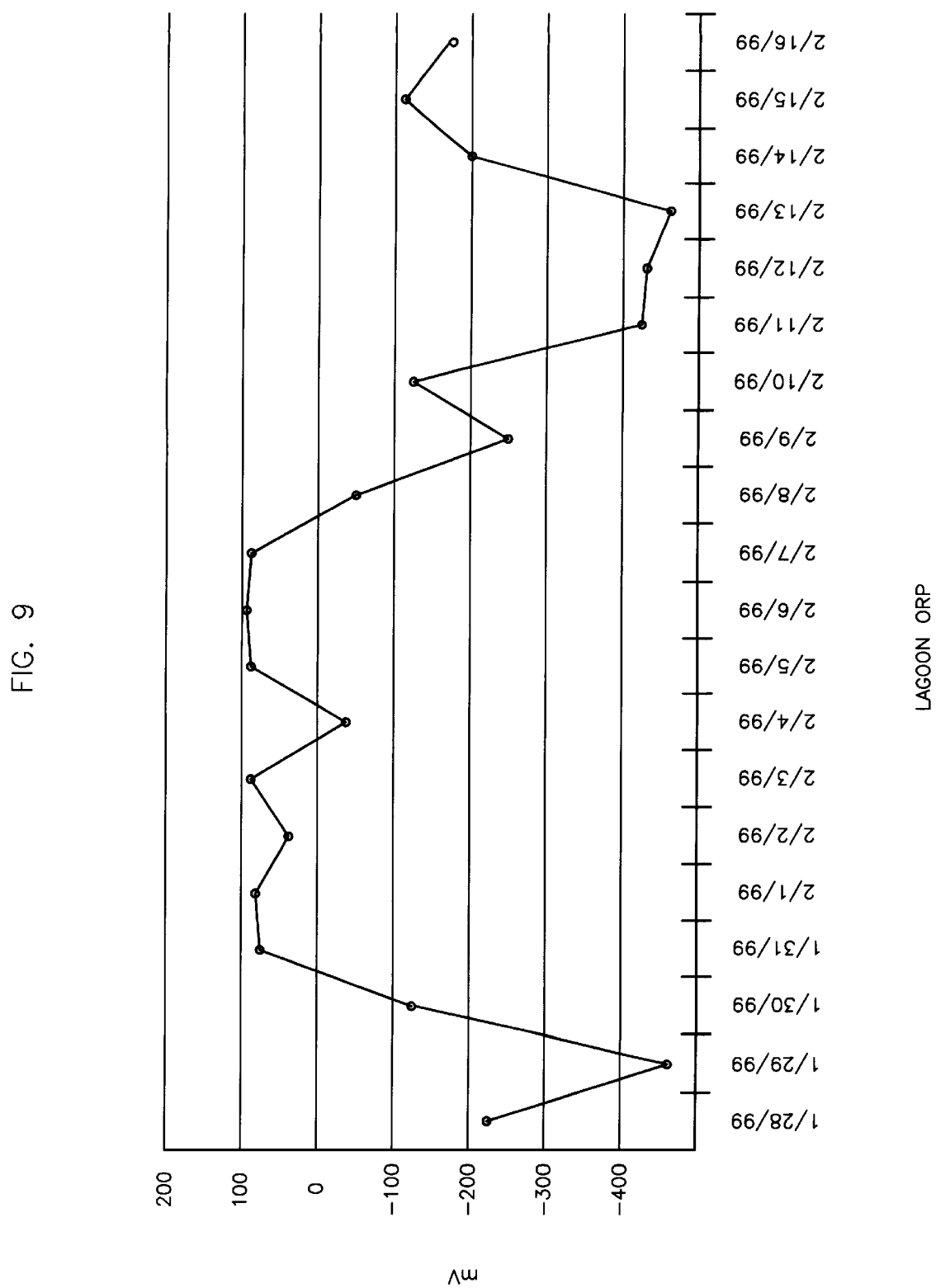
FIG. 9 is a table illustrating Lagoon ORP test data obtained from a hog farm agricultural test facility according to the first embodiment of the present invention.
Figure 10:
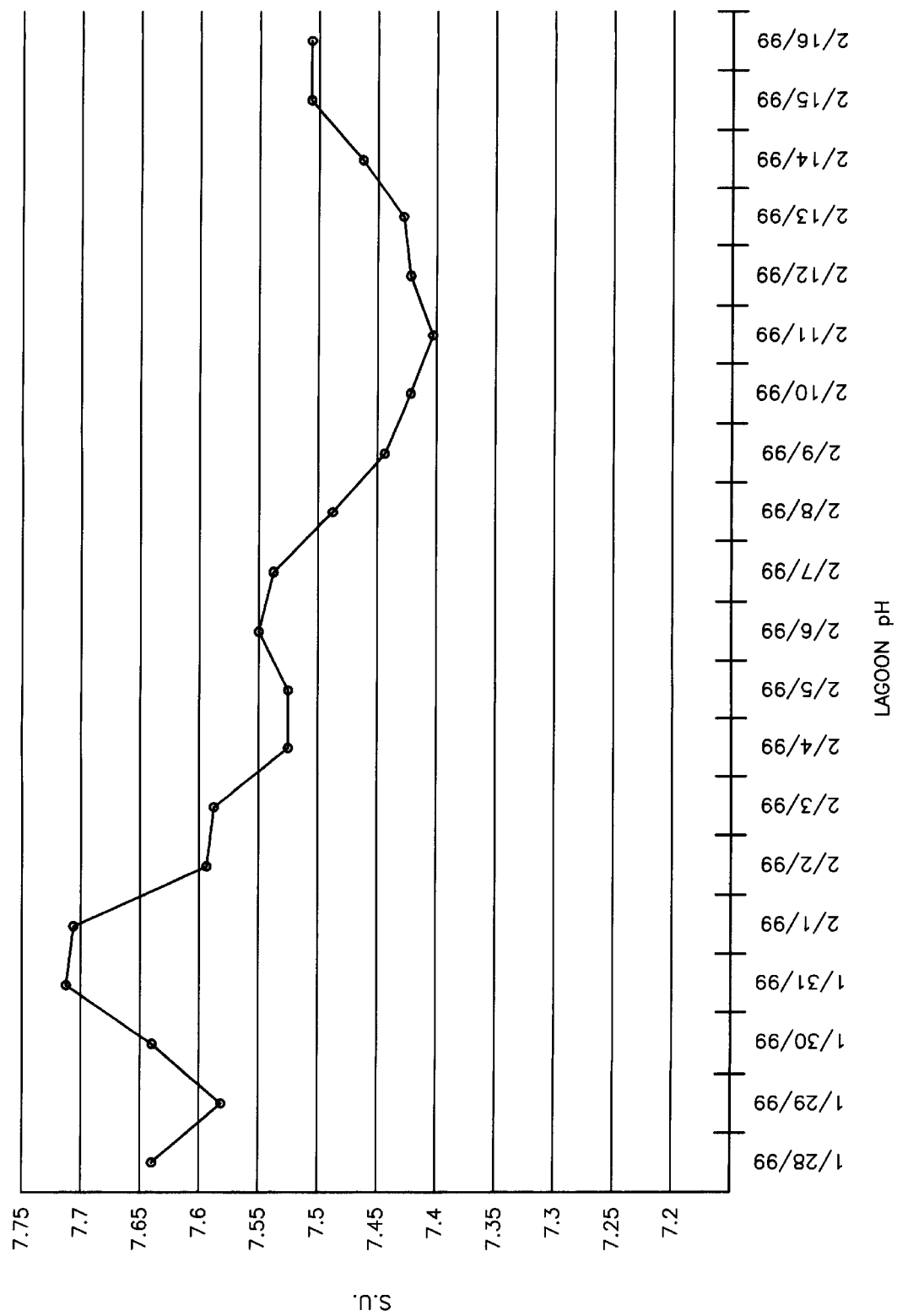
FIG. 10 is a table illustrating Lagoon pH test data obtained from a hog farm agricultural test facility according to the first embodiment of the present invention.
Figure 11:
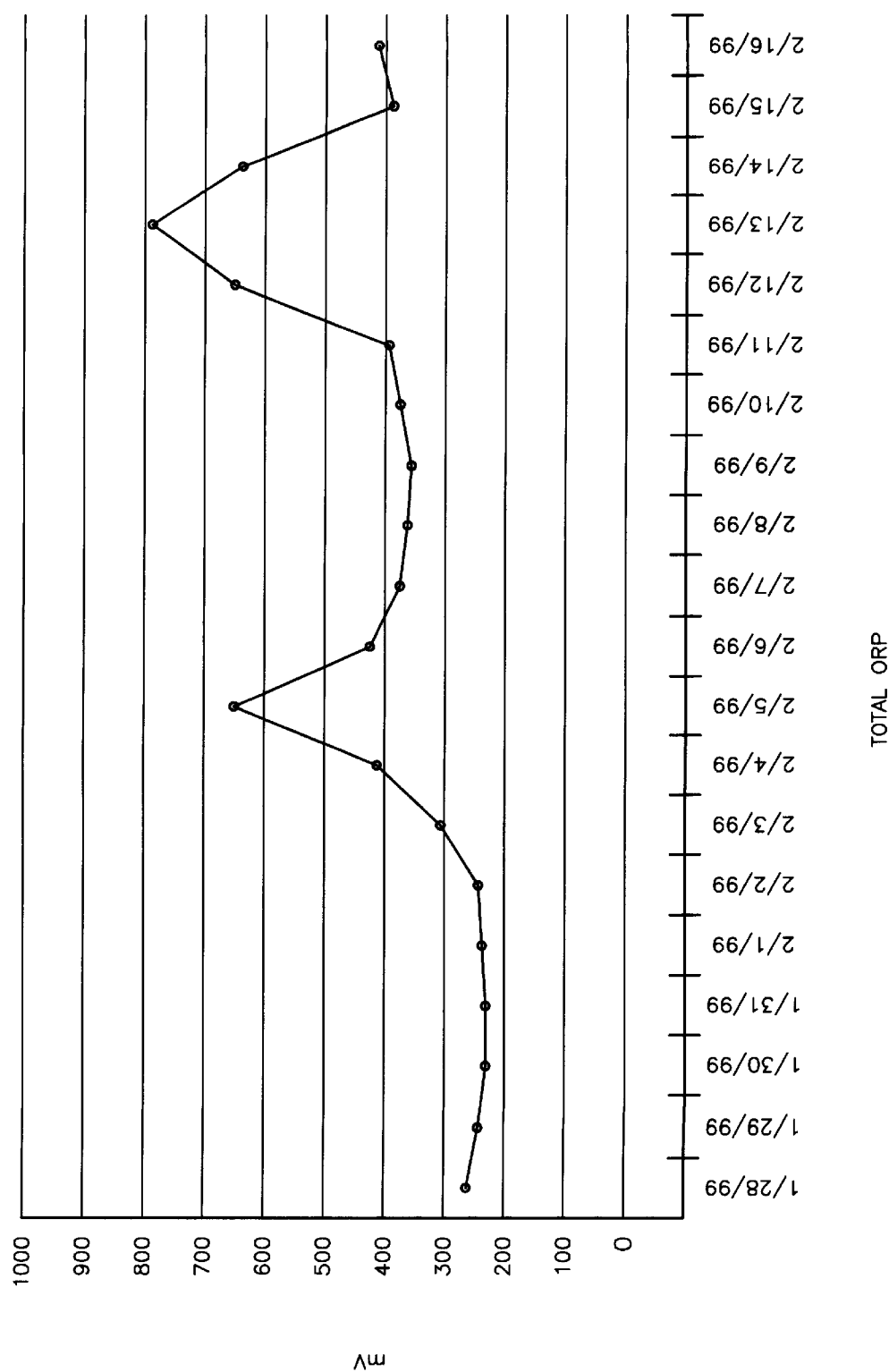
FIG. 11 is a table illustrating Total ORP test data obtained from a hog farm agricultural test facility according to the first embodiment of the present invention.
Figure 12:
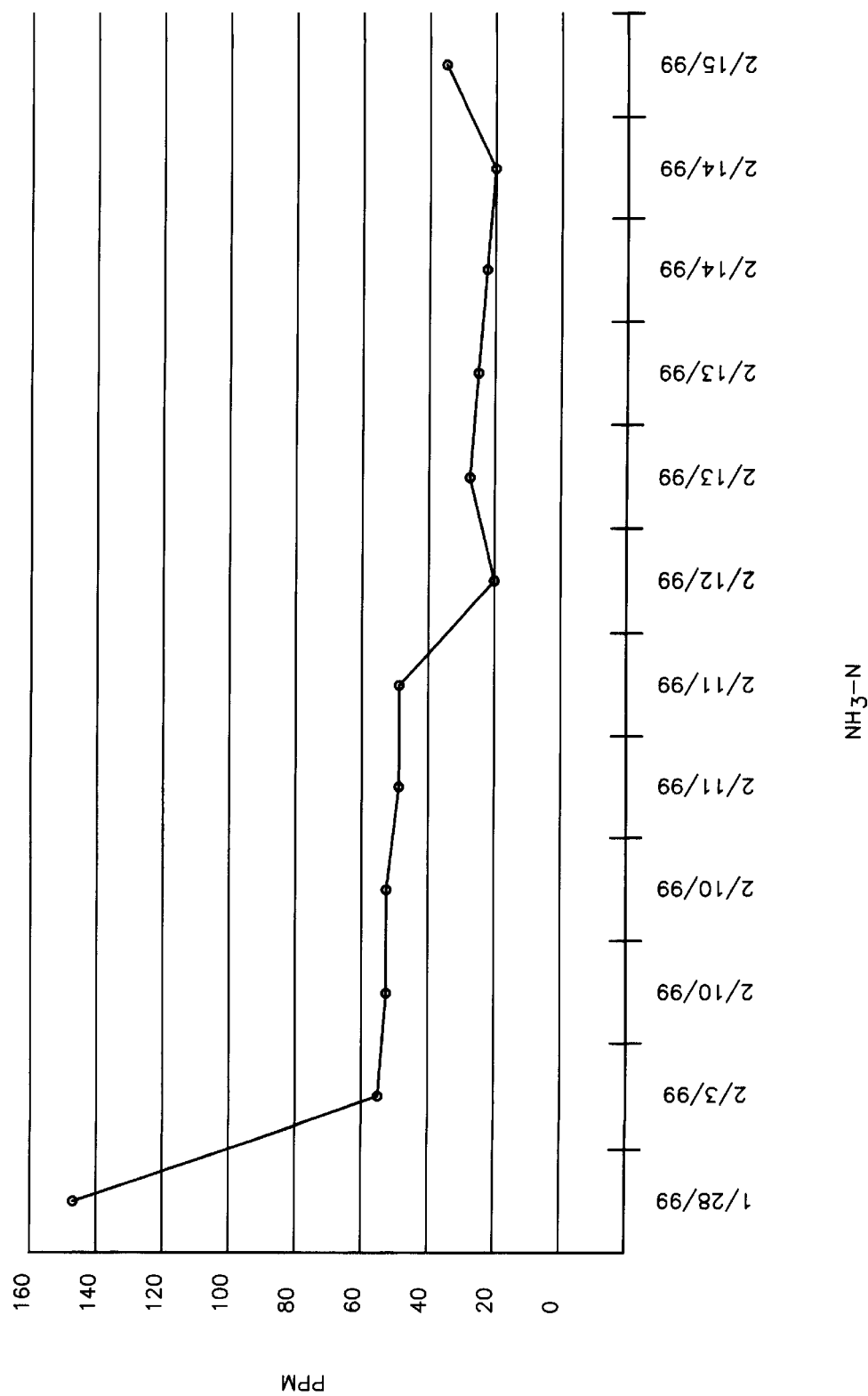
FIG. 12 is a table illustrating $NH_3$—N test data obtained from a hog farm agricultural test facility according to the first embodiment of the present invention.
Figure 13:
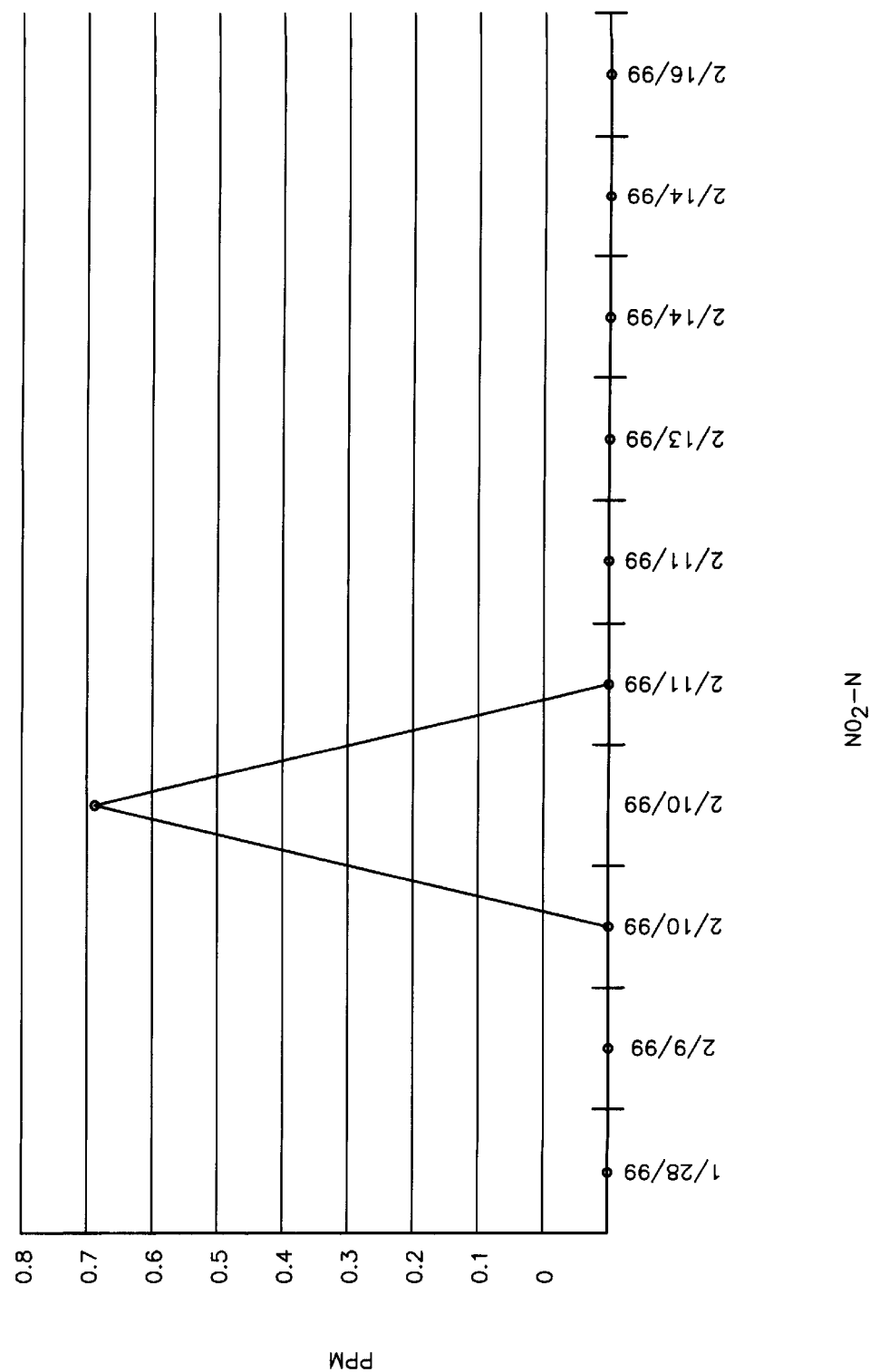
FIG. 13 is a table illustrating $NO_2$—N test data obtained from a hog farm agricultural test facility according to the first embodiment of the present invention.
Figure 14:
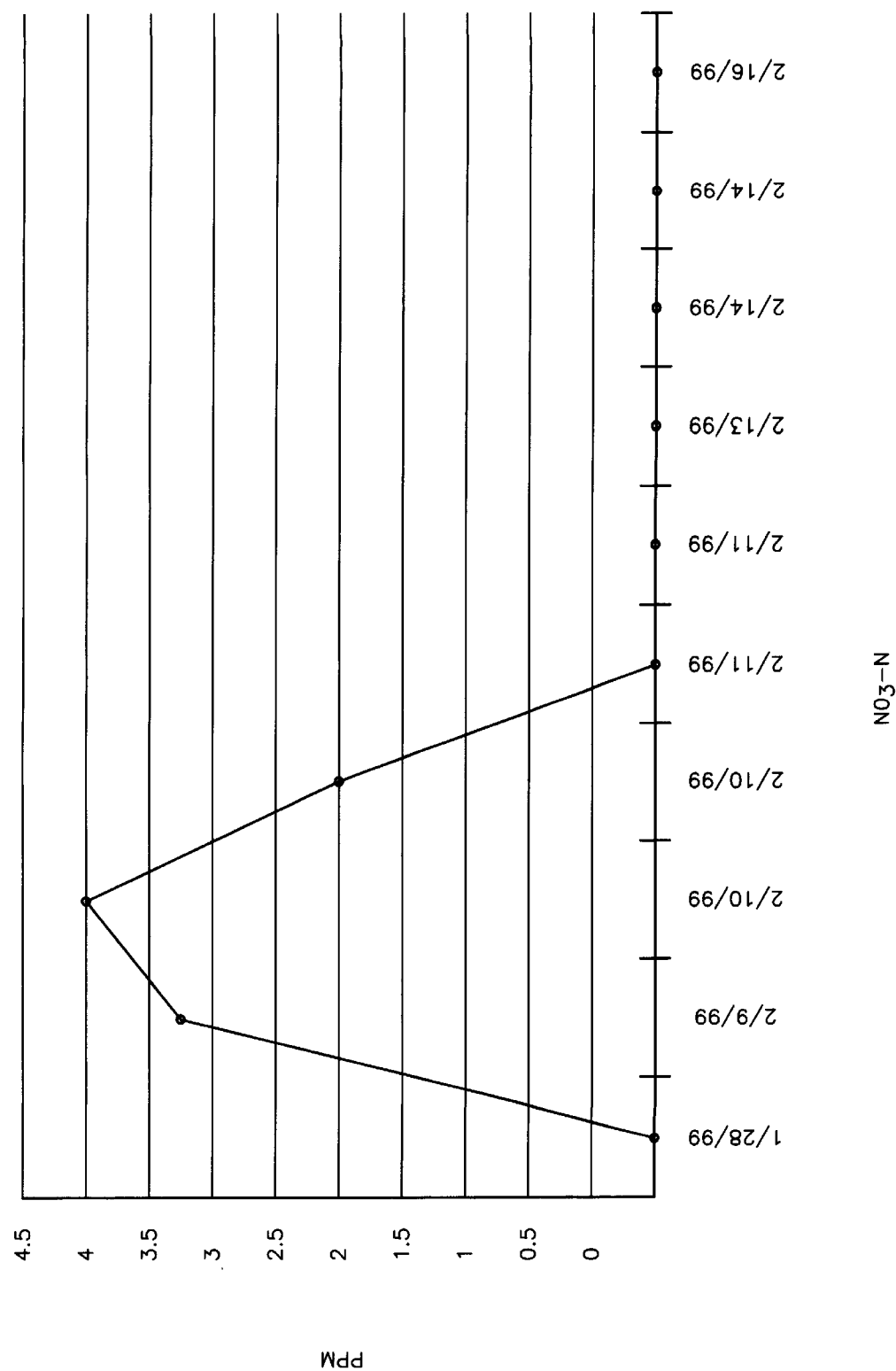
FIG. 14 is a table illustrating $NO_3$—N test data obtained from a hog farm agricultural test facility according to the first embodiment of the present invention.
Figure 15:
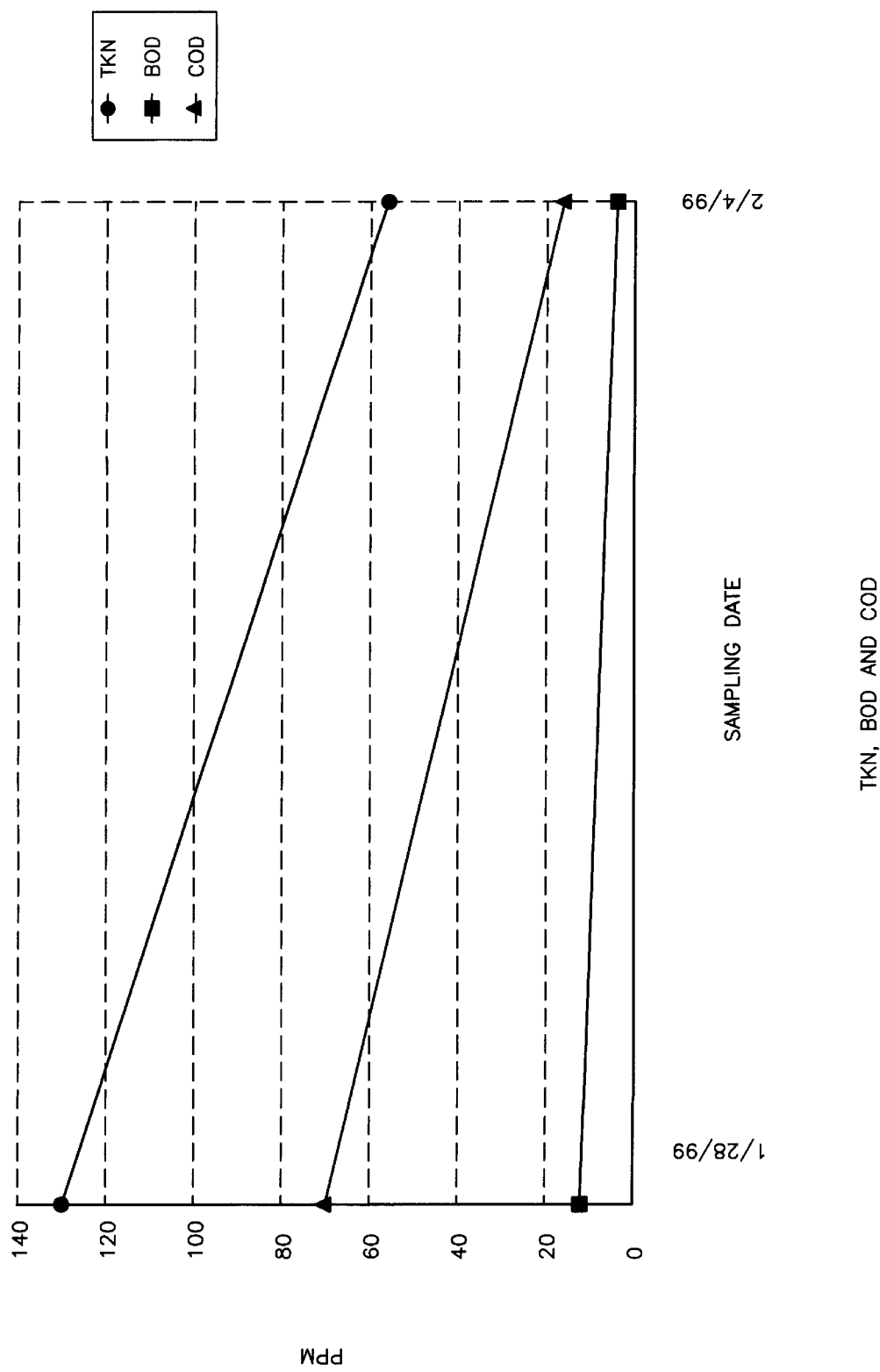
FIG. 15 is a table illustrating TKN, BOD and COD test data obtained from a hog farm agricultural test facility according to the first embodiment of the present invention.

After the wastewater passes through the mechanical screen, it is gravity fed through a conduit 12 into a primary aerobic treatment lagoon 10 where it undergoes aerobic digestion for a period of several days. The retention time is preferably less than a week and typically five days. The piping and conduits of the present invention are preferably schedule 80 PVC and range in size from 1 to 12 inches in diameter. The aerobic lagoon may be readily sized according to the quantity of wastewater to be treated. The aerobic lagoon illustrated in FIGS. 2–4 has a volume of approximately 500,000 gallons. Though an aerobic lagoon may be configured in a variety of shapes, preferably it is a rectangular structure having sloped sides. Soil and groundwater site constraints as well as the amount of surface area required to maximize oxygen diffusion dictate liquid depths and surface area. Construction of an appropriately sized and dimensioned aerobic lagoon is within the ability of one skilled in the art. Preferably, as illustrated in FIG. 6a, the aerobic lagoon incorporates a synthetic or earthen liner 18 to prevent groundwater contamination.

Digestion of organic wastes by microorganisms provides a great deal of pollutant reduction. Two forms of microbial digestion are aerobic, with oxygen, and anaerobic, without oxygen. The present invention is designed to emphasize and enhance aerobic digestion within the primary lagoon versus typical anaerobic digestion for hog wastewater treatment. Utilization of aerobic bacteria increases the rate of digestion and reduction of organic pollutants while eliminating the foul odors (methane, ammonia, hydrogen sulfide, etc.) without the addition of chemicals. Aerobic bacteria require free elemental (dissolved) oxygen. Therefore, to maximize and enhance the introduction of oxygen and ensure the continual mixing of the wastewater within the lagoon, a plurality of aerating means 14 are utilized. As illustrated in FIGS. 2–4, the plurality of aerating means are preferably installed at the periphery of the lagoon; however, the placement of the aerating means may be varied depending upon the size and configuration of the primary aerobic lagoon 10. It should be well understood that any number of aerating means might be configured depending upon the size of the aerobic lagoon. FIG. 6a illustrates a sectional view of an individual aerator 16 as oriented in relation to the edge of the aerobic lagoon and lagoon liner 18. The aerating means is supplied by means of a primary lagoon circulation/aeration system 19 that preferably incorporates at least a plurality of aeration pumps on a common distribution line to assure reciprocity. It is anticipated to introduce an excess amount of oxygen above the $BOD_5$ requirement, which will allow for nitrification to occur concurrently with the $BOD_5$ and organic nitrogen reductions once the system reaches steady state.

Large aeration pumps will be used to circulate the wastewater within the aerobic lagoon while injecting high concentrations of oxygen to support the aerobic bacteria. Based upon the total daily flow rate of approximately 100,000 gallons of waste per day, the hydraulic retention time is between three and seven days, preferably five days.

A specialized bacterium per se is not required for functioning of the present invention because aerobic species of bacteria occur naturally in animal waste. However, in a preferred embodiment of the present invention, beneficial bacteria are isolated, purified and propagated so that the aerobic lagoon may be seeded with a "slug dose" of the cultured bacteria. The purpose of the slug dose is to provide the cultured bacteria selective dominance in the lagoon so it will not have to out-compete other bacteria species for the food and oxygen source, thereby increasing digestion efficiency. The combination of aeration and specialized bacteria results in enhanced bioremediation. It is well within the skill of one in the art to select and propagate appropriate beneficial aerobic bacteria for seeding the aerobic lagoon. Continual addition of specialized bacteria is necessary to maintain selective dominance within the lagoon to prevent any non-beneficial species from out-competing the desired aerobic bacteria. However, once the lagoon has stabilized, lower-dosing rates should be required in order to maintain the selective dominance. Preferably, prior to initiation of full fledge treatment of wastewater, beneficial bacteria undergo an activation and growth period within the aerobic lagoon.

Based upon a hog farm agricultural test facility according to the first embodiment of the present invention, data has been routinely collected to monitor the performance of the aeration lagoon on a daily basis and has shown favorable results in a continuous flow operation (waste input=treated water output+precipitated solids output). Reductions in pollutant concentrations including ammonia-nitrogen, total nitrogen, total phosphorus, biochemical oxygen demand and chemical oxygen demand have all been favorable. The dissolved oxygen has been maintained at an acceptable level and the oxidation-reduction potential is actually reaching a positive value indicating the lagoon is in the oxidation state where ammonia can be oxidized to nitrite then nitrate and organics may be more rapidly broken down. See FIGS. 7–10 for test data summaries.

As illustrated in FIGS. 3 and 4, once wastewater had undergone aerobic digestion for a period of days, it is pumped through an uptake conduit 30 by means of a pump 32 for secondary treatment including solids separation and nitrification/denitrification. The secondary treatment may occur in either an in-ground lagoon (not shown) or in a plurality of aboveground storage tanks 20.

Flocculation and sedimentation of solids is a method of water clarification where the particles in the water will agglomerate either through natural attractions or through stimulation using processes such as polymer addition, ozonation, mixing, aeration and filtration. The aerobic sludge generated as a result will be fluffier, less dense and easier to handle and de-water than anaerobic sludge and the primary benefit is the lack of noxious odors. Sludge accumulation can be increased with the use of polymers for enhancing solids removal utilizing a much smaller area and less settling time versus natural gravity settling. Selective blended polymers are employed which will enhance the value of the resultant sludge by providing macro- or micro-nutrients such as phosphorus, calcium, magnesium, manganese, zinc or iron.

Specifically, the wastewater from the primary aerobic lagoon first flows into a plurality of conical bottom settling tanks 22a and 22b for suspended solids precipitation. As illustrated in FIG. 6, the conical bottom portion of the conical bottom settling tanks 22 aids in precipitating suspended solids. Depending upon the size of the conical bottom settling tank(s), the wastewater will be retained therein for a period of several hours. Prior to entry into the conical bottom settling tank(s), the wastewater flows through a polymer feed system 53 whereby a polymer is added to the wastewater to precipitate and promote solids separation prior to further treatment for drinking and misting use.

The polymer is preferably an organic cationic polymer such as Agrimond Poly-Clear™, but any similar polymer or flocculant (including but not limited to Ferric sulfate, $Fe_2(SO_4)_3$) sold by chemical manufacturers under a variety of trademarks may be utilized. Use of the polymer reduces organic loading on the system and renders the wastewater clear of suspended solids prior to treatment within the plurality of flat bottom tanks or as an alternative an in-ground, lined reservoir.

As necessary, a certain amount of the aerobically digested wastewater from the aerobic lagoon will be pumped to deluge tanks (not shown) located at livestock buildings by means of a deluge pump 34 and deluge conduit 36 prior to entry into the conical settling tanks for use as deluge water for periodic flushing of the sub-floor of the houses. As the deluge water passes through the space beneath the animal pens, this space acts as a trickle filter to aid in bacteria contact, aeration and growth activity of the aerobically digested wastewater from the aerobic lagoon. An additional benefit of using aerobically treated wastewater for periodic flushing of the sub-floor of the houses is the actual improvement of the living environment. This is a direct result of the significant reduction in ammonia, methane, hydrogen sulfide and other noxious gases generated in anaerobic digestion which are non-existent in this embodiment. The use of aerobically treated recycle flush water has resulted in 2.7 to 3.7 percent reductions in mortality rates during the first three months of operation at the initial installation.

Once the wastewater undergoes solids separation in the plurality of conical bottom settling tanks 22a and 22b, solids accumulated in the bottom regions of the conical tanks continuously drain via a conduit 39 into a decanting tank 61 where sludge thickening and primary sludge de-watering occurs. The decanting tank may be a modified drying bed or any mechanism or structure that permits the solids to precipitate to the bottom and permits the water to overflow into the series of drying beds. The supernatant from the decanting tank then overflows via a conduit 38 into a plurality of sludge drying beds 62.

The characteristics of aerobic sludge will differ from anaerobic sludge. Aerobic sludge will be a light colored, fluffy material with very little odor. Anaerobic sludge is a dark colored, thick and pasty material that smells like petroleum and/or any of the previously mentioned noxious gases depending on what is trapped within the pores of the sludge. The de-watered sludge will be relatively high in nutrients and once deactivated can be used for applications such as soil amendment, fertilizer or top-soil. See FIG. 16 for relevant analytical data.

Figure 5:
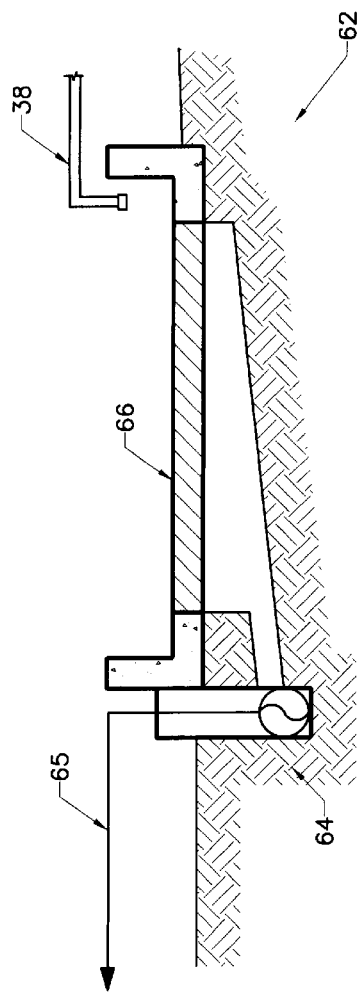
FIG. 5 is a sectional view of a drying bed according to the present invention.

Sludge drying beds 62 are used to receive the supernatant overflow from the decanting tank 61 for removal of suspended solids prior to discharge back to the aerobic treatment lagoon 10. As illustrated in FIG. 5, each of the plurality of drying beds 62 incorporates a filter media 66 will have an under drain collection area 64 where the liquid from the de-watered solids/sludge will be routed back into the aerobic lagoon via a gravity flow conduit 65 or via a sump pump. The drying beds are preferably graded from the influent end to the effluent end to facilitate gravity water drainage. Preferably, an underground drainage system comprising a layer of porous material such as sand and/or gravel is constructed under the drying bed(s) with catch basins and piping arranged to collect water for piping. Dried sludge will be removed periodically from the site for use based upon the amount generated on a daily basis.

As the collected solids are directed to the decanting tank, the liquid or supernatant is transferred via an overflow conduit 41 to a pair of mechanically aerated aboveground tanks 42a and 42b for further nitrification and organics reduction.

Following further aeration in aboveground tanks 42a and 42b, the wastewater is transferred via a pump 54 and conduit 40 to an aboveground tank 43a in which the wastewater undergoes denitrification in an anoxic environment. The wastewater will then be transferred to an aboveground tank 43b via a conduit 47 which is controlled by an electrical valve 59 to regulate the transfer of water to be made available for filtration and sterilization.

Wastewater that has undergone aerobic digestion and solids separation, nitrification/denitrification is stored in an aboveground tank 43b until needed for animal drinking and/or misting. By way of example, each finishing hog requires ~3.5 gallons per day for both drinking and misting with drinking water being provided twenty-four (24) hours per day based upon demand. Clarified water will be pumped from the storage tank 43b through control valve 63 via a conduit 46 to a water purification system 50 which utilizes a series of filters and disinfection with ozone prior to the wastewater being suitable for use as drinking and/or misting water.

After water is drawn from the aboveground denitrification/storage tank 43b through control valve 63 via conduit 46 via a filter/ozonation pump 48, it passes through filtration by means of a plurality of sand filters 52 and a single carbon filter 57. The sand and carbon filter may be standard filter(s) whose construction is well known in the art and may be designed and sized on the basis of quantity and flow rate as well as the desired porosity and quality of the water to be treated. Filtration using sand and (granular activated carbon (GAC)) aid in the removal of organics and particulate matter in the form of turbidity and suspended solids from the wastewater stream. The process involves the adsorption of particulate matter to the surfaces of the absorbent media and ultimate removal from the water flow. The trapped solids can then be removed through rapid back-washing for cleaning and the media requires replacement when it is spent.

Ozone is a strong oxidant commonly used as a disinfectant in wastewater treatment. Ozonation involves providing an electric charge to oxygen ($O_2$) to form ozone ($O_3$). The ozone is introduced into a water column as small bubbles to maximize the ozone-water interface and drive the ozone into solution. The ozone releases one of the three unstable oxygen atoms, which attacks and oxidizes impurities in the water. Advantages of using ozone include organics oxidation, bacterial and viral deactivation, removal of unpleasant taste, color and odor removal, turbidity reduction and elimination of trihalomethane (THM, resulting from halogenation of humic substances) formation. The use of ozone as a water purification agent is known in the art and will not be described in detail herein.

In practice, utilizing the first embodiment of the present invention, contamination reduction for the drinking and misting water treatment system has been >99 percent for parameters such as $BOD_5$, COD, suspended solids and microbial contaminants. By way of example, a target ORP for complete sterilization is $\geq +670$ mV or a sterile nitrate-nitrogen level of <40 ppm and in the initial installation ORP levels have exceeded +900 mV and nitrate-nitrogen levels have been $\leq 5.0$ ppm. See FIGS. 11 through 15 for the relevant analytical test data.

Any commercially available ozone machine or system 56 including contact columns 58 may be used inline in association with the system of the present invention, provided it can attain target purification requirements. However, in a preferred embodiment, the ozone system utilized is an AJT TecH$_2$Ozone® machine as disclosed and typified in U.S. Pat. No. 5,785,864 to Teran et al., the disclosure of which is incorporated herein in its entirety by reference. More specifically, in the present invention the ozone system preferably incorporates a plurality of contact columns 58 sized to ensure a minimum contact time of at least ten minutes for water within the columns. Each contact column is a longitudinally extending elongate hollow enclosure having a closed top-portion, a closed bottom portion, and a gas tight interior space therein. The required contact time and specific size of the contact columns may be readily ascertained by one skilled in the art. Utilizing the following calculations the ozone generator and water purification system can be readily sized for particular applications. First, the type and general characteristic of the water source (water quality, flow rate and gallons per minute) must be analyzed. Then the ozone dosage and contact time required are ascertained. Generally speaking, ozone generator size=flow rate (in gal/min)× 0.012×ozone dosage required (in mg/l) equals lbs./day.

Ozonated water is then pumped from the post-ozonated water storage tank 80 via a conduit 70 to a drinking water aboveground storage tank adjacent to each livestock house (not shown) prior to consumption by the livestock.

As necessary, well water may be utilized to "make-up" water to replace what is lost through evaporation, drift (misters) and consumption in order to maintain a consistent quantity within the treatment system.

Preferably, the apparatus and method of the present invention may be monitored and controlled via a computerized control system, housed in a control house 100, that utilizes a programmable logic controller (PLC) which will incorporate use of in-line analytical instrumentation for remote access. The secondary treatment phase, water purification system and control houses are preferably disposed upon a geoweb mat 90 or other suitable base such as concrete.

In practice, the first embodiment of the present invention results in no wastewater being discharged directly to surface water or groundwater. Additionally, unlike the prior art, the present system is a closed treatment system where all wastewater is reused within the facility and there is no land spread irrigation. The first embodiment of the present system is also beneficial since it greatly reduces the nutrient values in lagoons thereby eliminating odors associated with typical anaerobic lagoons and minimizes potential for possible pollution and pathogenic concerns regarding surface or groundwater as a result of lagoon leakage.

Dairy Farm Installation

The second embodiment of the apparatus and method of the present invention does not anticipate an entirely "closed loop" system. Rather, the second embodiment of the present invention results in a reduction of the nutrient loading of the treated wastewater such that wastewater effluent can be more safely discharged into smaller area crop lands. Additionally, the second embodiment of the present invention provides recovery of dairy wastes as a marketable fertilizer meeting specified and variable nutrient requirements. The clarified water can be recycled for irrigation, cooling barns, cow baths, and feed barn flushing. Further water treatment will make the recycled water available for animal drinking and other cleaning purposes. The second embodiment of the present invention provides a treatment system capable of reducing the nutrient loading in a stepwise fashion so that the wastewater can be used from different steps of treatment in order to apply the varying nutrient loads required by crops on a seasonal basis.

The second embodiment of the present invention is superior to conventional anaerobic lagoons with subsequent land application of wastes in that it: eliminates odor through aerobic treatment processes; significantly reduces nutrients of treated wastewater to be land applied; provides cleaner recycled flush water which reduces health risks to livestock; conserves water via treatment and recycling of wastewater for multiple uses and is energy efficient.

Traditionally, anaerobic treatment is used for treating agricultural waste streams. Anaerobic lagoons are considered low-rate systems designed to handle low organic loading rates primarily due to the high hydraulic retention times required by the relatively low temperature operation of these systems. Treatment takes place through contact with the microbial biomass that accumulates in the sludge on the bottom of the lagoon or is suspended due to the rising gases generated during decomposition.

Figure 17:
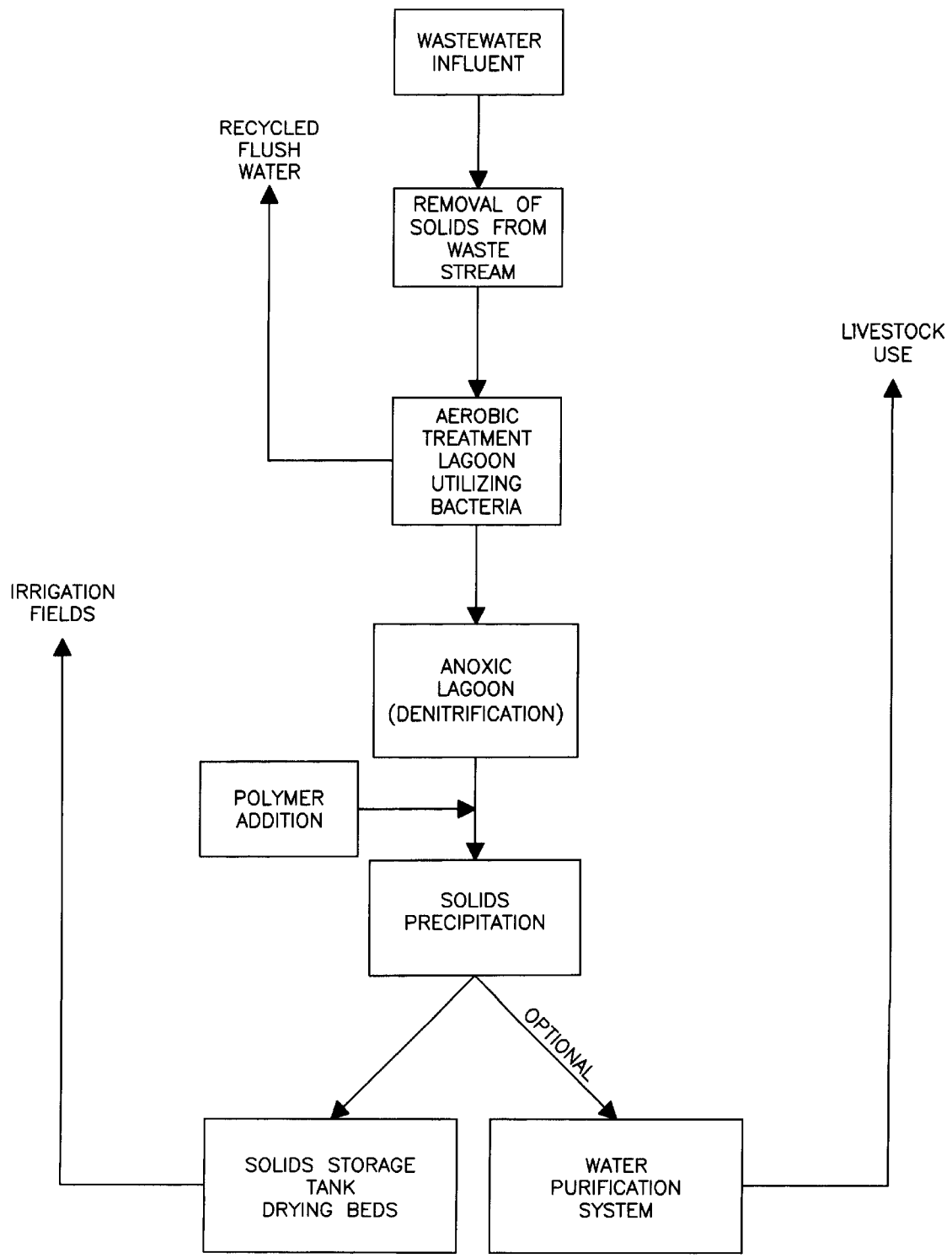
FIG. 17 is a flow diagram illustrating a second embodiment of the present invention.
Figure 18:
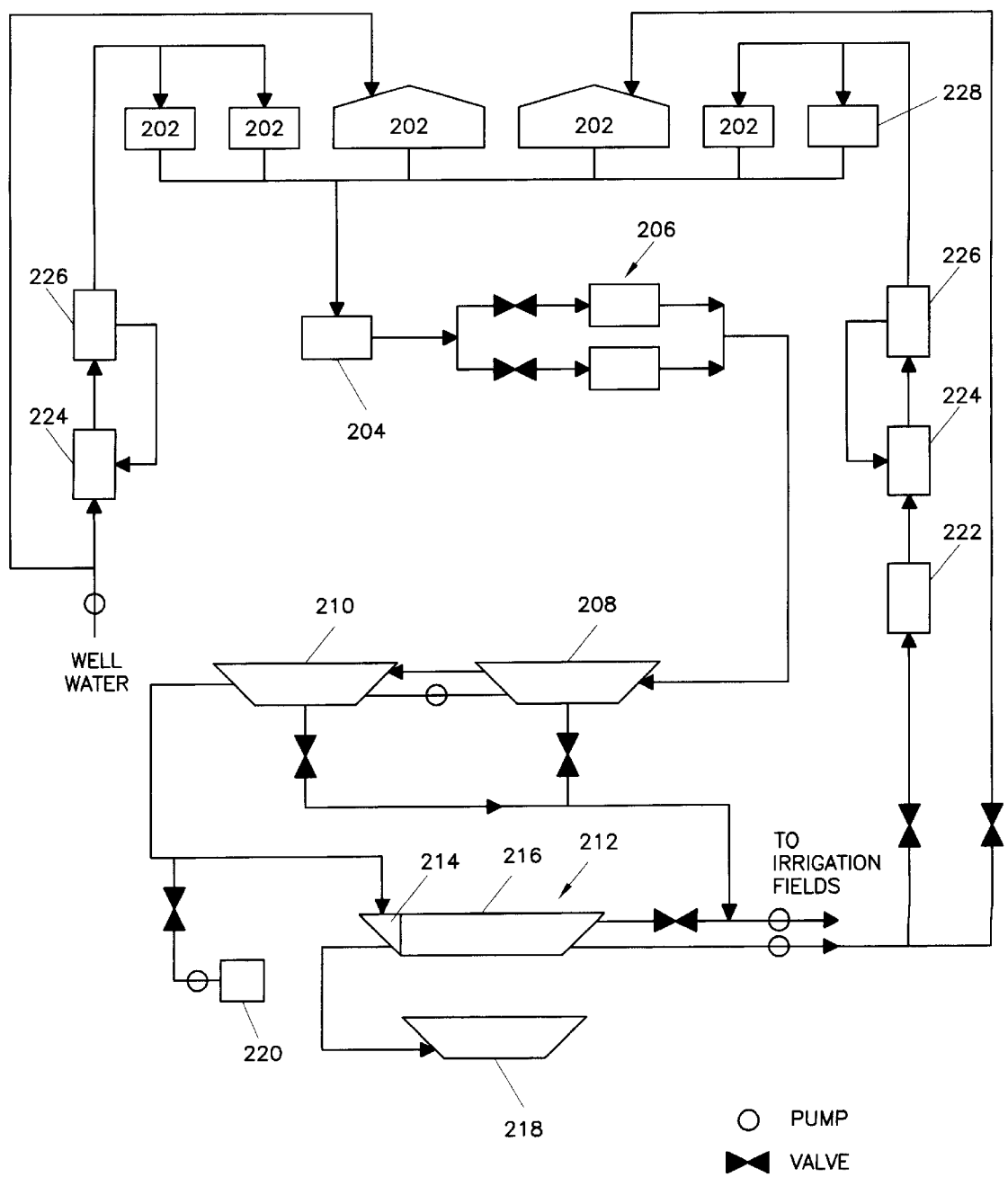
FIG. 18 is a flow diagram illustrating a second embodiment of the present invention including the optional water purification system.

The second embodiment, illustrated in FIGS. 17–18, embodying the principles and concepts of the present invention is sized and dimensioned to handle the agricultural waste stream from a dairy farm having approximately 6,100 dairy cows with a wastewater generation of ~500,000 gallons per day.

A "typical" dairy anaerobic lagoon liquid effluent may have the nutrient characteristics as listed in the following table:

| Parameter | Average (mg/l) | Minimum (mg/l) | Maximum (mg/l) |
| --- | --- | --- | --- |
| Total Nitrogen | 258 | 200 | 330 |
| Ammonia Nitrogen | 149 | 110 | 190 |
| Total Elemental P | 57 | 45 | 85 |
| Total Elemental K | 225 | 170 | 310 |

The required application rate of nitrogen and phosphorus is approximately 1,000 pounds and 200 pounds, respectively, per acre annually. The waste stream developed by the 1,000 acre farm, is based on approximately 500,000 gallons per day. Without a mechanism for treatment of the wastewater, there is a possibility of substantial pollution, for example, introduction of excess nutrients into the ground water.

As illustrated in FIGS. 17 and 18, wastewater influent collected from each animal retention area or penning area 202 will first have solids removed from the waste stream. A grit chamber 204 removes the majority of sand and large particulates from the waste stream. The grit chamber 204 is in fluid flow communication with parallel bulk solids separation chambers 206, which allow solids to settle out of the effluent before entering the first active step of the treatment process. The wastewater then enters an aerobic lagoon 208 that serves to greatly reduce organics and odor and promotes complete nitrification of the nitrogenous waste (converting ammonia to nitrates). The lagoon is ideally sized to store several days retention at the (500,000 gallons) per day loading. Similar to the first embodiment, an energy efficient aeration/circulation system (not shown) is incorporated to ensure mixing and oxygenation within the lagoon. Additionally, to improve the system efficiency, specialized bacteria should be isolated and propagated from the dairy waste to create a selective dominance within the lagoon that aids in the digestion of wastes.

From the aerobic lagoon 208, the wastewater is directed to an anoxic lagoon 210 that preferably is sized for several days retention. During retention in the anoxic lagoon, denitrification occurs, converting nitrate to nitrogen gas (which in conjunction with solid precipitation comprises clarification means). This phase of the process will be varied depending on the seasonal nutrient demands imposed by the crops. Specifically, the second embodiment of the apparatus and method of the present invention may be modified to obtain desired nutrient requirements in the treated effluent. This step may be omitted in its entirety if high quantities of nutrients, including nitrate-nitrogen and phosphates, are required by the crops. Conversely, the anoxic process can be maximized to remove the maximum amounts of nutrients.

After treatment in the aerobic lagoon or a combination of aerobic and anoxic treatment, the next state of the process is solids precipitation 212 that is primarily for phosphate removal. Solid precipitation may occur in any suitable tank or lagoon that permits the removal of sludge 214 and retains the clarified water 216 for future irrigation. As an optional alternative step, polymers 220 may be introduced into the waste stream to speed precipitation. The clarified water will be virtually phosphorus free. The accumulated sludge is rich in nutrients and is dried in drying beds 218 followed by deactivation for use a solid fertilizer. This sludge will be mixed with the bulk solids recovered from the pre-treatment process. The sludge will provide a mixture of ammonia and nitrate-nitrogen, phosphorus, potassium as well as other micro nutrients that are introduced from the cattle feed.

Preferably, the second embodiment further incorporates a water treatment system that may utilize a combination of filtration and ozone for further treatment of wastewater for reuse in the cow bath or cooling pond 228. Specifically, clarified water may be directed through a filtration system 222 and ozone system 224, such as the AJT TecH$_2$Ozone® system, to treat the water to a quality sufficient for bathing the cattle. Water can be stored 226 after treatment until needed. By further treating the clarified water for use with livestock, this allows for conservation of a large quantity of well water which is currently used to make up for the losses from the cow bath and cooling bath. Another treatment system may consist of filtration and ozone treatment of well water to provide sterile water to wash equipment and cattle in the milking parlor and refrigerated storage tanks.

The second embodiment incorporates a means for controlling nutrient levels that are applied to cropland via spray irrigation from the various stages of treatment. This capability enables an operator to obtain wastewater for irrigation at specific nutrient levels based on residual concentrations during the various phases of treatment. In a pilot study, contamination reduction values were observed for the treatment system (based upon only the aerobic and anoxic phases of treatment):

| Component Reductions through Aerobic and Anoxic Cycles of Treatment | | | | | |
|---|---|---|---|---|---|
| | % Reduction | | | | |
| | BOD | COD | TKN | TP | TSS |
| Maximum | 96.8 | 73.3 | 81.6 | 70.0 | 78.8 |
| Minimum | 88.0 | 65.3 | 52.3 | 8.2 | 40.0 |
| Average | 97.3 | 69.8 | 66.9 | 39.1 | 59.4 |

It is expected that contamination reductions in practical use at an agricultural facility will meet or exceed those observed during pilot testing once bacterial populations become established and the system reaches steady state. Polymer addition will precipitate even more phosphorus and various micronutrients from the effluent as required by the user.

Because typical anaerobic treatment is not meeting the effluent requirements for many dairies the alternative option is a "municipal" treatment facility. Municipal treatment plants are generally designed to meet a specific hydraulic load (gallons per day) and the estimated biochemical oxygen demand (BOD). The BOD for many municipal systems is approximately 200–250 (mg/l), the dairy waste is 750–800 (mg/l). For purposes of the following comparison, an installed unit is defined as 500,000 gallons/day@800 BOD (mg/l), which is equivalent to 1520 Kg of BOD/day. The energy usage comparison is based on a local (Cape Canaveral, Fla.) municipal treatment system. The energy usage was provided by the utility at 169,380 kWh/Month. The second embodiment as described herein has an energy requirement of 180 HP or 103680 kWh/Month.

| Energy Comparison by Treatment Method | | | | |
|---|---|---|---|---|
| Throughput (Millions g/day) | BOD (mg/l) | Daily BOD (kg BOD/day) | Power (kWh/day) | Energy (wKh/kg BOD) |
| Municipal 1.3 | 200 | 988 | 5646 | 5.71 |
| Present Invention 0.5 | 800 | 1520 | 3456 | 2.27 |

These results indicate that the present invention is approximately 2.5 times more energy efficient than similar municipal treatment methods.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts and method steps may be resorted to without departing from the spirit and scope of the invention.

Now that the invention has been described,

What is claimed is:

1. An apparatus for treatment of agricultural animal wastewater, said apparatus comprising in combination:

an aerobic lagoon having at least one wastewater inlet and at least one wastewater outlet and a plurality of aerating means, wherein said aerobic lagoon further comprises propagated aerobic bacteria selected to aerobically digest animal wastewater;

a contaminated wastewater source connected in fluid flow communication with said aerobic lagoon;

a clarification means in fluid flow communication with said aerobic lagoon wherein solids separation and nitrification/denitrification occur in an oxic/anoxic environment; and a plurality of drying bed in fluid flow communication with said clarification means wherein said precipitated solids are routed for further drying and removal.

2. The treatment apparatus as in claim 1, further comprising a water purification system in fluid flow communication with said water clarification means whereby ozone may be introduced into the contaminated water flow to provide disinfected water suitable for use by agricultural animals.

3. The treatment apparatus as in claim 1, wherein said clarification means further comprises a polymer feed system to precipitate and promote solids separation.

4. The treatment apparatus as in claim 1, further comprising a mechanical screening means disposed between said contaminated wastewater source and said aerobic lagoon wherein bulk solids are removed from the wastewater prior to the wastewater flowing into said aerobic lagoon thereby reducing oxygen demand on the apparatus.

5. The treatment apparatus as in claim 4 further comprising a mechanical roll press disposed between said mechanical screening means and said aerobic lagoon whereby said bulk solids are de-watered and the resultant wastewater is directed to said aerobic lagoon.

6. The treatment apparatus as in claim 1 wherein said clarification means further comprises an anoxic lagoon disposed between said aerobic lagoon and said plurality of drying beds.

7. The treatment apparatus as in claim 1 further comprising a water purification means whereby ozone may be introduced into the contaminated water flow to provide disinfected water suitable for use by agricultural animals.

8. An apparatus for treatment of agricultural animal wastewater, said apparatus comprising in combination:

an aerobic lagoon having at least one wastewater inlet and at least one wastewater outlet and a plurality of aerating means, wherein said aerobic lagoon further comprises propagated aerobic bacteria selected to aerobically digest animal wastewater;

a contaminated wastewater source connected in fluid flow communication with said aerobic lagoon;

a clarification means in fluid flow communication with said aerobic lagoon wherein solids separation and nitrification/denitrification occur in an oxic/anoxic environment, wherein said clarifying means further comprises a polymer feed system to precipitate and promote solids separation;

a plurality of drying beds in fluid flow communication with said clarification means wherein said precipitated solids are routed for further drying and removal;

a water purification means disposed between said water clarification means whereby ozone may be introduced into the contaminated water flow to provide disinfected water suitable for use by agricultural animals;

whereby no wastewater is discharged or spray irrigated and water is recycled for use by agricultural animals.

9. A method of for treatment of agricultural animal wastewater comprising the steps of:

analyzing the characteristics of the wastewater to be treated;

establishing the water quality parameters for the water and sizing the aerobic lagoon according to the quantity of water to be treated;

isolating and propagating beneficial aerobic bacteria such that a selective dominance of the beneficial aerobic bacteria may be established in said aerobic lagoon;

screening wastewater influent to remove bulk solids;

aerobically treating said wastewater in an aerobic lagoon said aerobic lagoon further comprises propagated aerobic bacteria selected to aerobically digest animal wastewater and a plurality of aerating means;

injecting said aerobically treated wastewater with a polymer blend prior to its entering the plurality of above-ground clarifying means;

clarifying said wastewater in a plurality of above-ground tanks whereby suspended solids are precipitated and a portion thereof diverted to a plurality of drying beds for drying;

filtering water flowing from the clarifying means prior to disinfecting with ozone;

treatment of said clarified water with ozone to provide drinking water suitable for agricultural animals and recycling said drinking water to said livestock buildings.

10. A method according to claim 9, wherein wastewater undergoes treatment in said aerobic lagoon for a period of three to seven days.

* * * * *